United States Patent
Ren et al.

(10) Patent No.: US 7,541,109 B2
(45) Date of Patent: *Jun. 2, 2009

(54) PASSIVE WATER MANAGEMENT TECHNIQUES IN DIRECT METHANOL FUEL CELLS

(75) Inventors: Xiaoming Ren, Menands, NY (US); Frank W. Kovacs, Waterford, NY (US); Kevin J. Shufon, Troy, NY (US); Shimshon Gottesfeld, Niskayuna, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/873,259

(22) Filed: Oct. 16, 2007

(65) Prior Publication Data

US 2008/0032182 A1   Feb. 7, 2008

Related U.S. Application Data

(63) Continuation of application No. 10/454,211, filed on Jun. 4, 2003, now Pat. No. 7,282,293.

(51) Int. Cl.
*H01M 2/14* (2006.01)
*H01M 4/00* (2006.01)
(52) U.S. Cl. .......................... 429/39; 429/40; 429/43
(58) Field of Classification Search .................... 429/39, 429/40, 43
See application file for complete search history.

(56) References Cited

U.S. PATENT DOCUMENTS 4,046,956 A   9/1977 Fanciullo (Continued)

FOREIGN PATENT DOCUMENTS

EP   0907979 B1   3/2000

(Continued)

OTHER PUBLICATIONS

Invitation to Pay Additional Fees and Partial International Search, PCT/US2004/011406, mailed Sep. 1, 2005, 9 pgs.

(Continued)

*Primary Examiner*—Patrick Ryan
*Assistant Examiner*—Julian Mercado
(74) *Attorney, Agent, or Firm*—Cesari and McKenna, LLP

(57) ABSTRACT

Passive water management techniques are provided in an air-breathing direct oxidation fuel cell system. A highly hydrophobic component with sub-micrometer wide pores is laminated to the catalyzed membrane electrolyte on the cathode side. This component blocks liquid water from traveling out of the cathode and instead causes the water to be driven through the polymer membrane electrolyte to the cell anode. The air-breathing direct oxidation fuel cell also includes a layer of cathode backing and additional cathode filter components on an exterior aspect of the cell cathode which lessen the water vapor escape rate from the cell cathode. The combination of the well laminated hydrophobic microporous layer, the thicker backing and the added filter layer, together defines a cathode structure of unique water management capacity, that enables to operate a DMFC with direct, controlled rate supply of neat (100%) methanol, without the need for any external supply or pumping of water. The cell anode is provided with a hydrophilic backing layer. When the water is driven through the polymer membrane electrolyte from the cell cathode to the cell anode chamber, it is available for the anodic reaction, and any excess water is carried out along $CO_2$ ventilation channels to the outside environment.

5 Claims, 12 Drawing Sheets

U.S. PATENT DOCUMENTS

| | | | |
|---|---|---|---|
| 4,132,695 | A | 1/1979 | Burkholder |
| 4,478,917 | A | 10/1984 | Fujita et al. |
| 4,537,840 | A | 8/1985 | Tsukui et al. |
| 4,562,123 | A | 12/1985 | Shimizu et al. |
| 4,593,534 | A | 6/1986 | Bloomfield |
| 4,612,261 | A | 9/1986 | Tsukui et al. |
| 4,673,624 | A | 6/1987 | Hockaday |
| 4,810,597 | A | 3/1989 | Kumagai et al. |
| 4,828,941 | A | 5/1989 | Sterzel |
| 4,931,168 | A | 6/1990 | Watanabe et al. |
| 5,409,785 | A | 4/1995 | Nakano et al. |
| 5,432,023 | A | 7/1995 | Yamada et al. |
| 5,460,896 | A | 10/1995 | Takada et al. |
| 5,482,792 | A | 1/1996 | Faita et al. |
| 5,523,177 | A | 6/1996 | Kosek et al. |
| 5,573,866 | A | 11/1996 | Van Dine et al. |
| 5,599,638 | A | 2/1997 | Surampudi et al. |
| 5,629,104 | A | 5/1997 | Crawford, Sr. et al. |
| 5,631,099 | A | 5/1997 | Hockaday |
| 5,641,585 | A | 6/1997 | Lessing et al. |
| 5,686,200 | A | 11/1997 | Barton et al. |
| 5,723,228 | A | 3/1998 | Okamoto |
| 5,723,229 | A | 3/1998 | Scheifers et al. |
| 5,759,712 | A | 6/1998 | Hockaday |
| 5,766,786 | A | 6/1998 | Fleck et al. |
| 5,773,162 | A | 6/1998 | Surampudi et al. |
| 5,795,668 | A | 8/1998 | Banerjee et al. |
| 5,863,395 | A | 1/1999 | Mah et al. |
| 5,916,699 | A | 6/1999 | Thomas et al. |
| 5,925,476 | A | 7/1999 | Kawatsu |
| 5,945,231 | A | 8/1999 | Narayanan et al. |
| 5,992,008 | A | 11/1999 | Kindler |
| 5,993,986 | A | 11/1999 | Wallin et al. |
| 6,024,848 | A | 2/2000 | Dufner et al. |
| 6,130,175 | A | 10/2000 | Rusch et al. |
| 6,232,010 | B1 | 5/2001 | Cisar et al. |
| 6,248,460 | B1 * | 6/2001 | Surampudi et al. ............ 429/15 |
| 6,248,469 | B1 | 6/2001 | Formato et al. |
| 6,265,093 | B1 | 7/2001 | Surampudi et al. |
| 6,268,077 | B1 | 7/2001 | Kelley et al. |
| 6,296,964 | B1 | 10/2001 | Ren et al. |
| 6,303,244 | B1 | 10/2001 | Surampudi et al. |
| 6,322,917 | B1 | 11/2001 | Acker |
| 6,322,918 | B1 | 11/2001 | Kelley et al. |
| 6,350,540 | B1 | 2/2002 | Sugita et al. |
| RE37,656 | E | 4/2002 | Bahar et al. |
| 6,383,671 | B1 | 5/2002 | Andrews et al. |
| 6,387,559 | B1 | 5/2002 | Koripella et al. |
| 6,410,180 | B1 | 6/2002 | Cisar et al. |
| 6,420,059 | B1 | 7/2002 | Surampudi et al. |
| 6,447,943 | B1 | 9/2002 | Peled et al. |
| 6,458,479 | B1 | 10/2002 | Ren et al. |
| 6,465,119 | B1 | 10/2002 | Koripella et al. |
| 6,468,683 | B1 | 10/2002 | Menzer et al. |
| 6,492,047 | B1 | 12/2002 | Peled et al. |
| 6,497,975 | B2 | 12/2002 | Bostaph et al. |
| 6,506,513 | B1 | 1/2003 | Yonetsu et al. |
| 6,509,112 | B1 | 1/2003 | Luft et al. |
| 6,566,003 | B2 | 5/2003 | Acker |
| 6,589,684 | B1 | 7/2003 | Surampudi et al. |
| 6,627,342 | B1 | 9/2003 | Nakamura et al. |
| 6,630,266 | B2 | 10/2003 | Hockaday et al. |
| 6,632,553 | B2 | 10/2003 | Corey et al. |
| 6,645,651 | B2 | 11/2003 | Hockaday et al. |
| 6,660,423 | B2 | 12/2003 | Neutzler et al. |
| 6,686,081 | B2 | 2/2004 | Gottesfeld |
| 6,808,838 | B1 * | 10/2004 | Wilson ........................ 429/34 |
| 6,924,055 | B2 | 8/2005 | Hirsch et al. |
| 6,981,877 | B2 | 1/2006 | Ren et al. |
| 7,005,206 | B2 | 2/2006 | Lawrence et al. |
| 7,282,293 | B2 * | 10/2007 | Ren et al. ...................... 429/39 |
| 2001/0051293 | A1 | 12/2001 | Narayanan et al. |
| 2002/0019352 | A1 | 2/2002 | Baldauf et al. |
| 2002/0155341 | A1 | 10/2002 | Finkelshtain et al. |
| 2002/0187374 | A1 | 12/2002 | Yamauchi et al. |
| 2003/0049510 | A1 | 3/2003 | Ren |
| 2003/0129464 | A1 | 7/2003 | Becerra et al. |
| 2004/0265680 | A1 | 12/2004 | Ren et al. |
| 2005/0081429 | A1 | 4/2005 | Ren et al. |

FOREIGN PATENT DOCUMENTS

| | | |
|---|---|---|
| EP | 1 150 370 A2 | 10/2001 |
| EP | 1 274 144 A2 | 1/2003 |
| WO | WO 01/75999 A1 | 10/2001 |
| WO | WO 03/026035 A2 | 3/2003 |
| WO | WO 03/077345 A1 | 9/2003 |

OTHER PUBLICATIONS

Notification of Transmittal of the International Search Report and the Written Opinion of the International Searching Authority, or the Declaration, PCT/US2004/011406, mailed Nov. 4, 2005, 19 pgs.

Notification of Transmittal of the International Search Report and the Written Opinion of the International Searching Authority, or the Declaration, PCT/US2004/020709, mailed Nov. 4, 2005, 20 pgs.

Invitation to Pay Additional Fees and Partial International Search, PCT/US2004/020709, mailed Sep. 1, 2005, 10 pgs.

Notification of the Transmittal of the International Search Report, or the Declaration, PCT/US03/04766, mailed May 8, 2003, 6 pgs.

Mund, K. et al., Analysis of a Direct Methanol Fuel Cell Using a Solid Polymer Electrolyte Membrane, from Fuel Cell Program and Abstracts, 1992 Fuel Cell Seminar, Nov. 29, 1992-Dec. 2, 1992, pp. 461-464.

Lubovskiy, V.V. et al., System for Monitoring and Regulating Fuel Concentration in an Anolyte, USSR Author's Certificate, SU 1,610,522 A1, Application Date: Sep. 15, 1988, Published: Nov. 30, 1990.

Ren, Xiaoming et al., Electronic and Electrochemical Materials and Devices MST-11, MS-D429, Los Alamos National Laboratory, Los Alamos, NM 87545, Electrochemical Society Proceedings vol. 95-23, Oct. 1995.

Narayanan, S.R. et al., Electrochemical Characteristics of Carbon-Supported Pt, Pt-Sn, Pt-Ru Electrodes for the Oxidation of Methanol and Formaldehyde, Jet Propulsion Laboratory, California Institute of Technology, Pasadena, CA, in Fuel Cell Program and Abstracts, 1992 Fuel Cell Seminar, Nov. 29-Dec 2, 1992, pp. 233-236 and 461-464.

Maynard, Helen L. et al., Miniaturized Fuel Cells for Portable Power, Presented at the Conference on Small Fuel Cells and Battery Technologies 2000, Apr. 27-27, 2000, New Orleans, LA, all pages.

Sharke, Paul, Pocket-Size PEMs, Mechanical Engineering feature article, Downloaded from Http://www.memagazine.org/contents/current/features/pems/pems.html. on Jul. 25, 2000.

Gottesfeld, Shimshon et al., Polymer Electrolyte Fuel Cells as Potential Power Sources for Portable Electronic Devices, pp. 487-517.

U.S. Appl. No. 10/454,211, filed Jun. 4, 2003, by Xiaoming Ren et al., for a Passive Water Management Techniques in Direct Methanol Fuel Cells.

A. Blum et al., "Water-neutral Micro Direct-Methanol Fuel Cell (DMFC) for Portable Applications," The Journal of Power Sources, vol. 117 (May 15, 2003), pp. 22-25.

\* cited by examiner

PASSIVE WATER MANAGEMENT TECHNIQUES IN DIRECT METHANOL FUEL CELLS

RELATED APPLICATIONS

This application is a continuation of U.S. Ser. No. 10/454,211, filed by Xiaoming Ren et al. Jun. 4, 2003, which is a continuation in part of Ser. No. 10/413,983, filed by Xiaoming Ren et al. on Apr. 15, 2003.

BACKGROUND OF THE INVENTION

1. Field of the Invention

This invention relates generally to direct oxidation fuel cells, and more particularly, to such fuel cells that include passive water management techniques.

2. Background Information

Fuel cells are devices in which electrochemical reactions are used to generate electricity from fuel and oxygen. A variety of materials may be suited for use as a fuel depending upon the materials chosen for the components of the cell. Organic materials in liquid form, such as methanol are attractive fuel choices due to the their high specific energy.

Fuel cell systems may be divided into "reformer-based" systems (i.e., those in which the fuel is processed in some fashion to extract hydrogen from the fuel before the hydrogen is introduced into the fuel cell system) or "direct oxidation" systems in which the fuel is fed directly into the cell without the need for separate internal or external fuel processing. Many currently available fuel cells are reformer-based. However, because fuel processing is complex and generally requires costly components which occupy significant volume, reformer based systems are more suitable for comparatively high power applications.

Direct oxidation fuel cell systems may be better suited for applications in smaller mobile devices (e.g., mobile phones, handheld and laptop computers), as well as for somewhat larger scale applications. In direct oxidation fuel cells of interest here, a carbonaceous liquid fuel (typically methanol or an aqueous methanol solution) is directly introduced to the anode face of a membrane electrode assembly (MEA).

One example of a direct oxidation fuel cell system is the direct methanol fuel cell or DMFC system. In a DMFC system, a mixture comprised of predominantly methanol or methanol and water is used as fuel (the "fuel mixture"), and oxygen, preferably from ambient air, is used as the oxidant. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed to completion at an acceptable rate, as is discussed further hereinafter.

Typical DMFC systems include a fuel source or reservoir, fluid and effluent management systems, and air management systems, as well as the direct methanol fuel cell ("fuel cell") itself. The fuel cell typically consists of a housing, hardware for current collection, fuel and air distribution, and a membrane electrode assembly ("MEA") disposed within the housing.

The electricity generating reactions and the current collection in a direct oxidation fuel cell system take place at and within the MEA. In the fuel oxidation process at the anode, the fuel typically reacts with water and the products are protons, electrons and carbon dioxide. Protons from hydrogen in the fuel and in water molecules involved in the anodic reaction migrate through the proton conducting membrane electrolyte ("PCM"), which is non-conductive to the electrons. The electrons travel through an external circuit which contains the load, and are united with the protons and oxygen molecules in the cathodic reaction. The electronic current through the load provides the electric power from the fuel cell.

A typical MEA includes an anode catalyst layer and a cathode catalyst layer sandwiching a centrally disposed PCM. One example of a commercially available PCM is NAFION® (NAFION® is a registered trademark of E.I. Dupont de Nemours and Company), a cation exchange membrane based on polyperfluorosulfonic acid, in a variety of thicknesses and equivalent weights. The PCM is typically coated on each face with an electrocatalyst such as platinum, or platinum/ruthenium mixtures or alloy particles. A PCM that is optimal for fuel cell applications possesses a good protonic conductivity and is well-hydrated. On either face of the catalyst coated PCM, the MEA further typically includes a "diffusion layer". The diffusion layer on the anode side is employed to evenly distribute the liquid or gaseous fuel over the catalyzed anode face of the PCM, while allowing the reaction products, typically gaseous carbon dioxide, to move away from the anode face of the PCM. In the case of the cathode side, a diffusion layer is used to allow a sufficient supply of and a more uniform distribution of gaseous oxygen to the cathode face of the PCM, while minimizing or eliminating the accumulation of liquid, typically water, on the cathode aspect of the PCM. Each of the anode and cathode diffusion layers also assist in the collection and conduction of electric current from the catalyzed PCM to the current collector.

Direct oxidation fuel cell systems for portable electronic devices ideally are as small as possible for a given electrical power and energy requirement. The power output is governed by the rates of the reactions that occur at the anode and the cathode of the fuel cell operated at a given cell voltage. More specifically, the anode process in direct methanol fuel cells, which use acid electrolyte membranes including polyperfluorosulfonic acid and other polymeric electrolytes, involves a reaction of one molecule of methanol with one molecule of water. In this process, water molecules are consumed to complete the oxidation of methanol to a final $CO_2$ product in a six-electron process, according to the following electrochemical equation:

$$CH_3OH + H_2O \rightarrow CO_2 + 6H^+ + 6e^- \tag{1}$$

Since water is a reactant in this anodic process at a molecular ratio of 1:1 (water:methanol), the supply of water, together with methanol to the anode at an appropriate weight (or volume) ratio is critical for sustaining this process in the cell. In fact, it has been known that the water:methanol molecular ratio in the anode of the DMFC has to significantly exceed the stoichiometric 1:1 ratio suggested by process (1), to guarantee complete anodic oxidation to $CO_2$, rather than partial oxidation to either formic acid, or formaldehyde, $4e^-$ and $2e^-$ processes, respectively, described by equations (2) and (3) below:

$$CH_3OH + H_2O \rightarrow HCOOH + 4H^+ + 4e^- \tag{2}$$

$$CH_3OH \rightarrow H_2CO + 2H^+ + 2e^- \tag{3}$$

Equations (2) and (3) are partial anodic oxidation processes that are not desirable and which might occur if the ratio of water to methanol is not sufficient during a steady state operation of the cell. Particularly, as is indicated in process (3), which involves the partial oxidation of methanol, water is not required for this anode process and thus, this process may dominate when the water level in the anode drops below a certain point. The consequence of process (3) domination, is an effective drop in methanol energy content by about 66% compared with consumption of methanol by process (1), which results in a lower cell electrical energy output. In addition, it would lead to the generation of undesirable anode products such as formaldehyde.

Typically, it has been difficult to provide a desirable water/methanol mixture at the anode catalyst in a small, lower volume, compact DMFC technology platform. The conventional approaches to this problem can be divided into two categories:

(A) active systems based on feeding the cell anode with very diluted (2%) methanol solution, pumping excess amount of water at the cell cathode back to cell anode and dosing the re-circulation liquid with neat methanol stored in a reservoir; and (B) passive systems requiring no pumping, utilizing reservoirs of methanol/water mixtures.

Class A systems, which are active systems that include pumping, can provide, in principle, maintenance of appropriate water level in the anode, but this is accomplished by dosing neat methanol from a fuel delivery cartridge into a recirculation loop. The loop also receives water, which is collected at the cathode and pumped back into the recirculating anode liquid. In this way, an optimized water/methanol anode mix can be maintained. The concentration is usually controlled using a methanol concentration sensor. The advantage of this approach is that a concentrated methanol solution comprised of a molecular fraction of at least 50% methanol, and preferably "neat" methanol (pure methanol) can be carried in the cartridge while a diluted methanol solution carried in the re-circulating loop supplies the required methanol to water ratio at the cell anode. Carrying a high concentration fuel source and recovering water from cell cathode reduces the amount of water needed to be carried in the cartridge and thus reduces the weight and volume of the reservoir and thus, the overall system. The disadvantage is that while neat methanol can be carried in the cartridge, the system suffers from excessive complexity due to the pumping and recirculation components as well as the concentration sensor, which can result in significant parasitic power losses and increases in the weight and volume of the power system. This can be particularly severe when the power system is used as a small scale power source.

The class B systems, comprising passive systems, have the advantage of system simplicity achieved by eliminating water recovering, pumping and recirculating devices by using a design that carries a mixture of water and methanol in the fuel reservoir. This type of system can be substantially, or even completely passive, as long as the rate of water loss through the cathode is adjusted by the water carried "on board" the fuel cell system, typically within the fuel reservoir. The problem with this approach is that it requires that a significant amount of water which has no intrinsic energy content, be carried in the fuel reservoir or cartridge.

A fuel cell system that adapts the best features of both the Class A and Class B systems, without the disadvantages of these two known systems, would be most advantageous for portable power applications. However, attempts to develop such a system heretofore have been unsuccessful due to the challenges associated with the fundamental feature of process (1), i.e., the need to provide water to the anode at, at least, a mole fraction of 50%, or at 25% by weight of methanol in the mixture with methanol. In fact, in the common approach, a solution of as high as 98% water (and 2% methanol) has to be introduced to the anode aspect of the membrane electrolyte assembly, in order to minimize the amount of methanol that passes through the membrane electrolyte without participating in the anodic reaction (a phenomenon known as methanol "cross-over").

Consequently, the possibility of supply of highly concentrated methanol, including 100% methanol, directly from a reservoir into the anode compartment, has not been considered practical to date without, at the same time, actively supplying water to the anode catalyst by concurrently collecting water from the cathode and pumping it back to the anode of the fuel cell. In other words, the introduction of neat methanol or highly concentrated methanol solution (>10% by weight) directly to the anode in a passive system has not, up to now, been considered feasible, due to the expected results of significant loss of methanol flowing across the membrane and anode processes other than process (1), noted above.

In such cells the water available is exclusively generated internally at the cathode, and therefore water distribution throughout the cell must be managed carefully. In considering the management of water, there are several competing considerations to be taken into account. The fundamental challenge is to generate a sufficient flow of cathodically generated water, from the cathode to the anode to provide for the complete oxidation of methanol as per process (1). To do so requires that a portion of the cathodically generated water be pushed back to the anode and have any excess water released as water vapor from the cathode aspect of the fuel cell. In turn, this means that a balance between passive, evaporative loss of water from the cathode and the confinement and controlled distribution of water within the cell must be achieved. There remains a need therefore for a direct oxidation fuel cell system which includes techniques for passively delivering an effective supply of liquid water back to the anode while preventing cell dry out due to excessive water vapor loss and without significantly impeding air access to the cathode catalyst layer as result of excess liquid water buildup in the cathode.

It is thus an object of the invention to provide a direct oxidation fuel cell system that includes passive water management techniques which prevent both cell dehydration and cathode flooding.

It is a further object of the present invention to provide a direct oxidation fuel cell system that is capable of operating on neat methanol or a highly concentrated methanol solution as a fuel source and delivering this fuel directly to the anode, but also allows sufficient water to be present at the anode to result in the efficient completion of anode process (1) at the membrane electrolyte using passive water management techniques, i.e., without recovering water from the cell cathode and without using recirculation and pumping mechanisms. More specifically, it is a further object of the invention, to develop direct oxidation fuel cell applications where air is supplied to the cathode without forced air flow, where water is managed passively, and where a concentrated methanol solution is supplied to the anode chamber of the fuel cell.

SUMMARY OF THE INVENTION

The disadvantages of prior techniques are overcome by the solutions of the pre-sent invention, which provides a unique, air-breathing direct oxidation fuel cell with neat, or highly concentrated methanol fuel supply, and with passive water management techniques. The air-breathing direct oxidation fuel cell includes a layer of cathode backing and additional cathode filter components covering the cathode backing to manage the water vapor escape rate from the cell cathode without significantly impeding air access to the cathode catalyst so that the oxygen required for the cathode half reaction of the cell can effectively enter the cell. For the purposes of this application, "backing" and "backing layer" shall have the same meaning as "diffusion layer".

The direct oxidation fuel cell of the present invention also includes components to push liquid water from the cathode aspect of the fuel cell back to the anode aspect of the fuel cell and substantially resist cathode "flooding" under conditions where the water production rate by cell reaction is higher than the water vapor escape rate. In accordance with the present invention, a highly hydrophobic component with sub-micron wide pores is provided in close proximity to the cathode aspect of the membrane electrolyte. This microporous hydrophobic component blocks liquid water that is generated on the cathode face of the membrane from migrating away into the backing layer(s) and consequently forces liquid water to travel from the cathode across the membrane to the cell anode. The hydraulic permeability of membrane electrolytes that are typically used in direct methanol fuel cell technology, including, but not limited to intrinsically protonically conductive membranes (sometimes referred to as ionomeric membranes), an example of which is NAFION®, is relatively low, thus it is necessary to build up a significant hydraulic pressure to direct the liquid water from the cathode aspect of the membrane electrolyte to the anode aspect of the membrane electrolyte. As such, the microporous hydrophobic layer must be well designed and very well bonded to the cathode aspect of the membrane electrolyte.

In accordance with the invention, the cell anode could then be provided with a hydrophilic backing layer to facilitate the required water flow in the cathode-to-anode direction. Consequently, when the water is driven through the membrane from the cathode aspect of the catalyzed membrane into the cell anode chamber, the liquid water is easily disbursed over the hydrophilic anode backing layer. Some of the water arriving at the anode is used for the anodic reaction (1) and excess water at the cell anode can be carried out via $CO_2$ ventilation channels to the outside environment. Cell dehydration and cathode flooding are thus prevented by passively directing liquid water back to the anode and removing excess water, if any, at the cell anode, thus ensuring stable cell performance within a wide range of environmental temperatures and humidity. The back flux of liquid water from the cathode to the anode enables the fuel cell to utilize the cathodically generated water to support anodic reactions without external supply of water to the anode, enabling passive operation with direct feed of concentrated methanol to the anode chamber of the fuel cell.

BRIEF DESCRIPTION OF THE DRAWINGS

The invention description below refers to the accompanying drawings, of which.

DETAILED DESCRIPTION OF AN ILLUSTRATIVE EMBODIMENT

Water is involved in a number of key cell processes that occur during the operation of a direct oxidation fuel cell. First, a protonically-conductive membrane electrolyte of the fuel cell, which may include an intrinsically protonically conductive membrane, (typically NAFION®), must be well hydrated in order to conduct protons effectively. NAFION® absorbs water and thus allows the protons in the electricity-generating reaction, i.e., the 6H+ generated in process (1) described above, to pass through the membrane aided by water molecules. This results in a drag of water by the protons moving from the anode aspect of the membrane electrolyte to the cathode aspect of the membrane electrolyte.

Secondly, as will be understood by those skilled in the art, the cathode half reaction involves generation of water according to the reaction of $3/2O_2+6H^++6e^-=>3H_2O$. There is thus a net production of water in a direct oxidation fuel cell environment. However, this water is not optimally distributed within the cell because water accumulates at the cathode of the cell at a rate proportional to cell current as determined by the sum of the water generation rate in the cathode reaction equation noted above, and the water flow (or drag) across the membrane from anode to cathode accompanying the flow of protons. Eq. (5) shows the combined formation rates of water accumulation at the cathode aspect of the catalyzed membrane electrolyte. Finally, water gets depleted from the anode at a rate proportional to cell current, because water is utilized in the process at the anode, i.e., process (1) noted above. Some of the water at the cathode aspect of the catalyzed membrane electrolyte is removed from the cell through the cathode backing layers and/or any added cathode filters or in the form of water vapor. Too high a rate of water vapor escape can result in drying out the membrane electrolyte and cell, leading to compromised performance of the fuel cell system. Insufficient water vapor escape can result in excessive accumulation of liquid water at the cathode aspect of the fuel cell, which may significantly impede air access to the cathode catalyst layer, which can also diminish performance of the fuel cell system.

In accordance with the present invention, light-weight, passive components are deployed within the direct oxidation fuel cell to manage the water distribution within the cell and to provide a highly efficient, air-breathing cell that can operate on a supply of neat methanol or a highly concentrated methanol solution.

Figure 1:
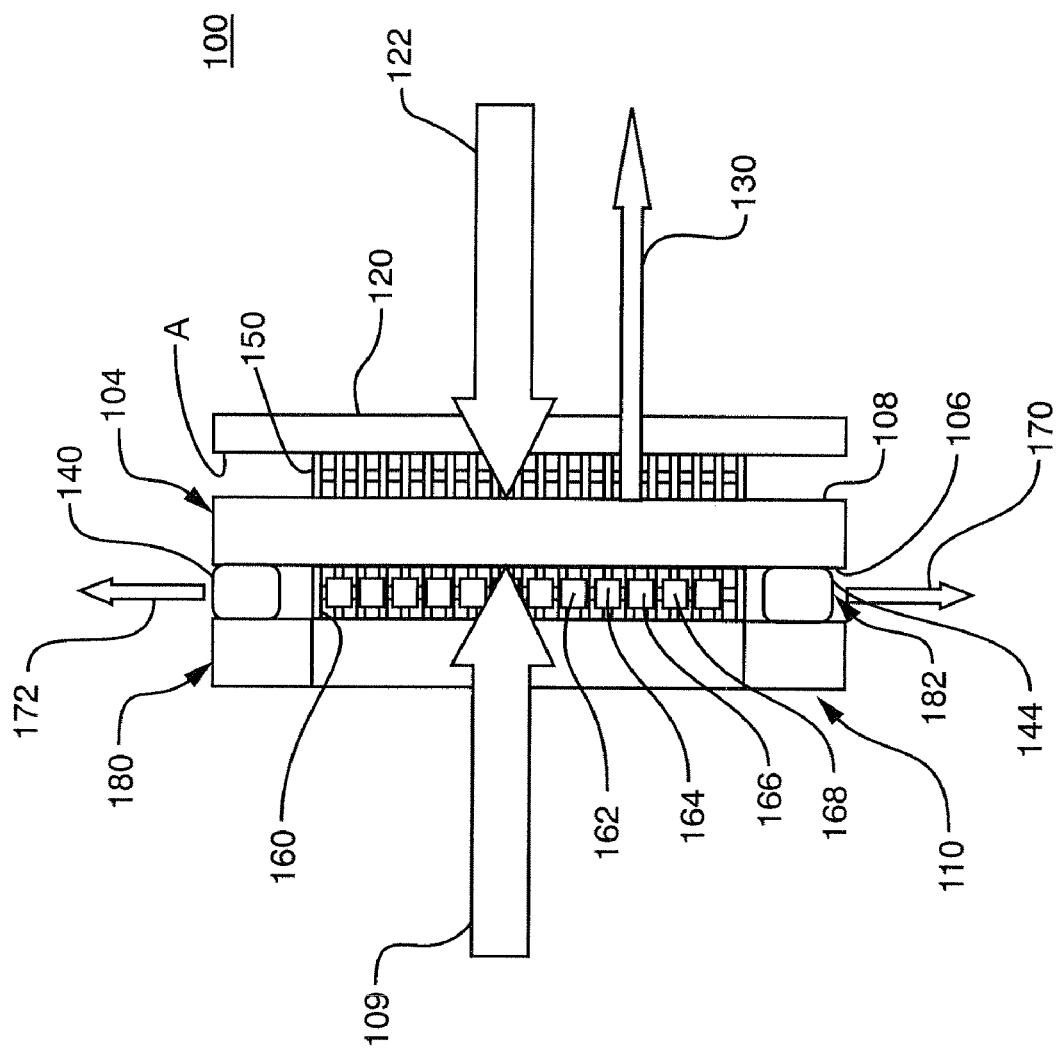
FIG. 1 is a schematic cross section of a portion of a direct oxidation fuel cell including the passive water management components of the present invention.

More specifically, FIG. 1 is a simplified schematic illustration of the unique water management features and structure of the passive system of the present invention. The figure illustrates one embodiment of the direct oxidation fuel cell of the present invention for purposes of description, though the invention set forth herein may include a number of other components in addition to those shown while remaining within the scope of the present invention. Many alternative fuel cell architectures are within the scope of the present invention. Further, the illustrative embodiment of the invention is a DMFC with the fuel substance being substantially comprised of neat methanol. It should be understood, however, that it is within the scope of the present invention that other fuels may be used in an appropriate fuel cell. Thus, as used herein, the word fuel shall include methanol and ethanol, dimethyloxymethane, methylorthoformate or combinations thereof and aqueous solutions and other carbonaceous substances amenable to use in direct oxidation fuel cells and fuel cell systems.

The fuel cell 100 (FIG. 1) includes a catalyzed membrane electrolyte 104, which may be a protonically conductive, electronically non-conductive membrane, sometimes referred to herein as a "PCM". As noted, in certain applications of the invention, an intrinsically protonically conductive membrane may be employed, though the invention is not limited to such membranes. One example of the material that may be used for the catalyzed membrane, which is commercially available is NAFION®, a registered trademark of E.I. Dupont de Nemours and Company, a cation exchange membrane based on a polyperfluorosulfonic acid in a variety of thicknesses and equivalent weights. The membrane is typically coated on each face with an electrocatalyst such as platinum or a platinum/ruthenium mixture or allied particles. Thus, following the application of the appropriate catalyst, it is referred to herein as the "catalyzed membrane electrolyte." One face of the catalyzed membrane electrolyte 104 is the anode face or anode aspect 106. The opposing face of the catalyzed membrane electrolyte 104 is on the cathode side and is herein referred as the cathode face or the cathode aspect 108 of the membrane electrolyte 104.

The carbonaceous fuel substance, which in this instance is neat methanol, is introduced as schematically illustrated by the arrow 109 through a mass transport delivery element 110 placed substantially parallel to the membrane electrolyte. The mass transport delivery element 110 is described in detail in the patent application, of which this application is a Continuation-in-Part; commonly-owned U.S. patent application Ser. No. 10/413,983, filed on Apr. 15, 2003 by Ren et al. for a DIRECT OXIDATION FUEL CELL OPERATING WITH DIRECT FEED OF CONCENTRATED FUEL UNDER PASSIVE WATER MANAGEMENT and which is presently incorporated herein by reference.

The anode reaction is: $CH_3OH+H_2O \Rightarrow 6H^+ + 6e^- + CO_2$. In accordance with this reaction, one molecule of methanol and one molecule of water react at the anode face 106 of the membrane electrolyte 104, the result of which is that 6 protons ($6H^+$) cross through the membrane 104. This is made possible by the well-hydrated NAFION® substance of the membrane, which allows the protons to be carried across the membrane 104. On the cathode side, ambient air is introduced into the cathode portion of the fuel cell 100 via the cathode filter 120 as illustrated by the arrow 122. The reaction at the cathode aspect 108 of the membrane 104 is

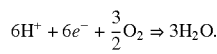

$$6H^+ + 6e^- + \frac{3}{2}O_2 \Rightarrow 3H_2O.$$

Thus, the protons and electrons combine with oxygen in the ambient air at the cathode face 108 to form water ($H_2O$). This water can escape from the cathode face of the cell primarily in the form of water vapor, but also as liquid water as illustrated by the arrow 130. At the anode side, the anode reaction includes the generation of carbon dioxide at the anode aspect 106 of the membrane 104. Carbon dioxide exits the fuel cell 100 via carbon dioxide removal channels, or openings, illustrated at 140 and 144, as discussed in further detail hereinafter.

In accordance with the invention, it is important to avoid excess water loss at the cell cathode in order for the cell to be operable with neat methanol feed at the cell anode without water recovery from cell cathode. To prevent liquid water from penetrating through the cathode backing, a highly hydrophobic backing layer with sub-micrometer pores is used. The static hydraulic pressure generated by the capillary force of the hydrophobic micropores and exerted on the liquid water is sufficiently high to drive the liquid water back, even through a nanoporous polymer electrolyte membrane such as Nafion, to the cell anode. In order to further manage water vapor loss from the cell cathode, suitable cathode backing and cathode filter combinations are used to reduce the rate of diffusion of water vapor without overly limiting the oxygen access to the cell cathode. In targeting these features of liquid water "push-back" and attenuated water vapor escape, a number of components can be included in a variety of combinations to produce optimal cell performance while allowing neat methanol to be provided as the fuel supply, without active recirculation mechanisms.

Figure 2:
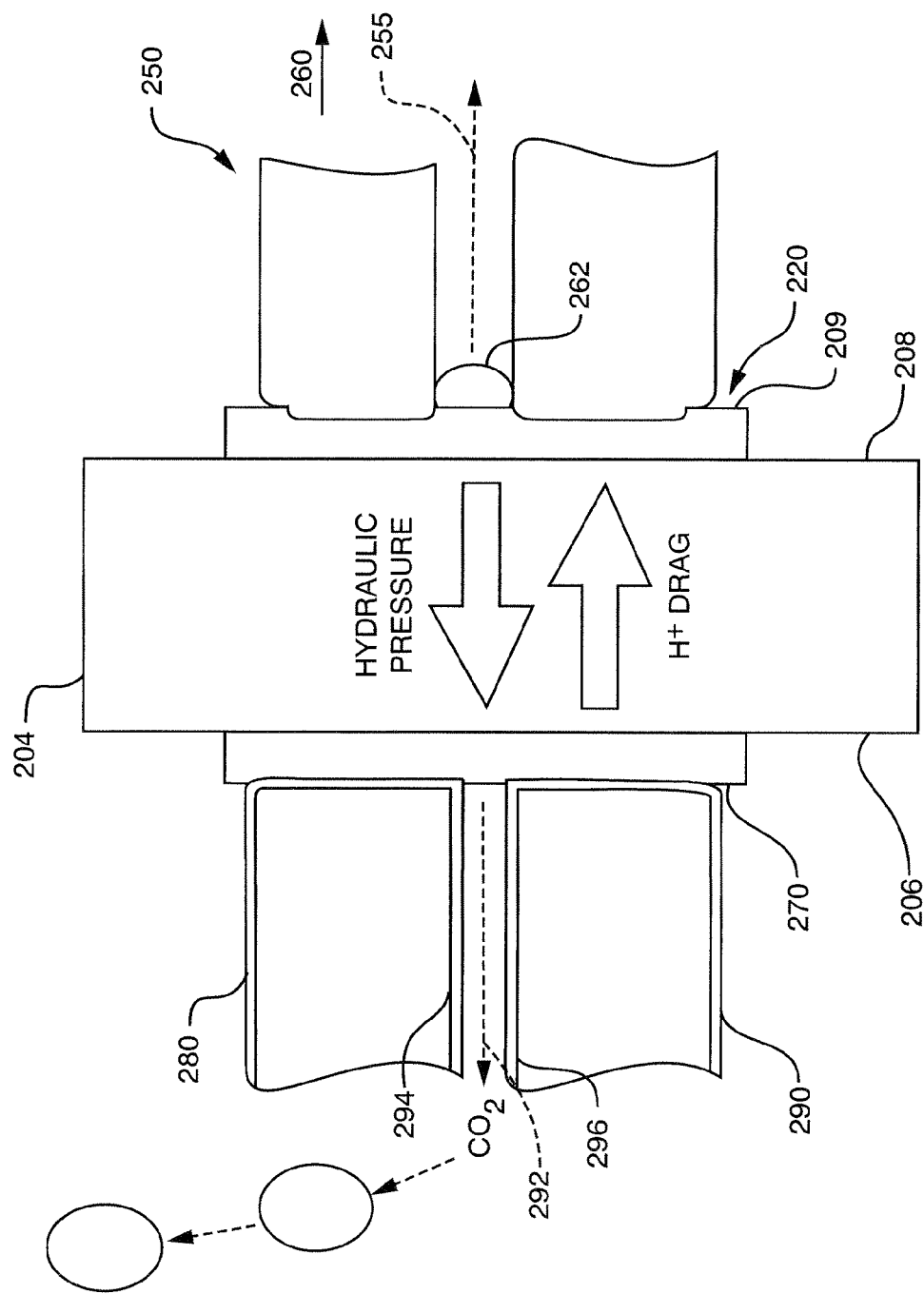
FIG. 2 is an enlarged schematic illustration of the catalyzed membrane electrode assembly and water management aspects of the present invention illustrated in detail.

More specifically, as illustrated in FIG. 1, on the cathode side of the fuel cell 100, a highly hydrophobic cathode element 150 is disposed within the cell 100 in close proximity to the catalyzed cathode aspect 108 of the membrane 104. The hydrophobic cathode element 150 is substantially comprised of expanded PTFE or microporous layer formed from polytetrafluoroethylene-coated carbon particles, or other hydrophobic materials or structures that block liquid water escape. The function of the element 150 may be further understood with respect to FIG. 2. In FIG. 2, polymer electrolyte membrane 204 has an anode aspect 206 and a cathode aspect 208. The cathode aspect 208 includes a cathode catalyst layer 209. When oxygen from ambient air comes into contact with the catalyzed cathode aspect 208 of the membrane protons, which are migrating through the membrane, as illustrated by the arrow 210, combine with electrons (not shown) such that water is produced in the area generally designated 220. In accordance with the pre-sent invention, the hydrophobic cathode element 250, substantially prevents liquid water from traveling out of the cathode portion of the fuel cell. More specifically, liquid water domains, such as 262, are substantially blocked from passage across the hydrophobic cathode element 250. The liquid water cannot pass through the hydrophobic cathode element 250 due to the sub-micrometer pore diameter and the hydrophobic nature of the pores of the cathode element 250 and thus the liquid water is driven back across the membrane 204 in the direction of the arrow 270 to the anode side of the cell, by the hydraulic pressure built up within the microporous array.

Figure 3:
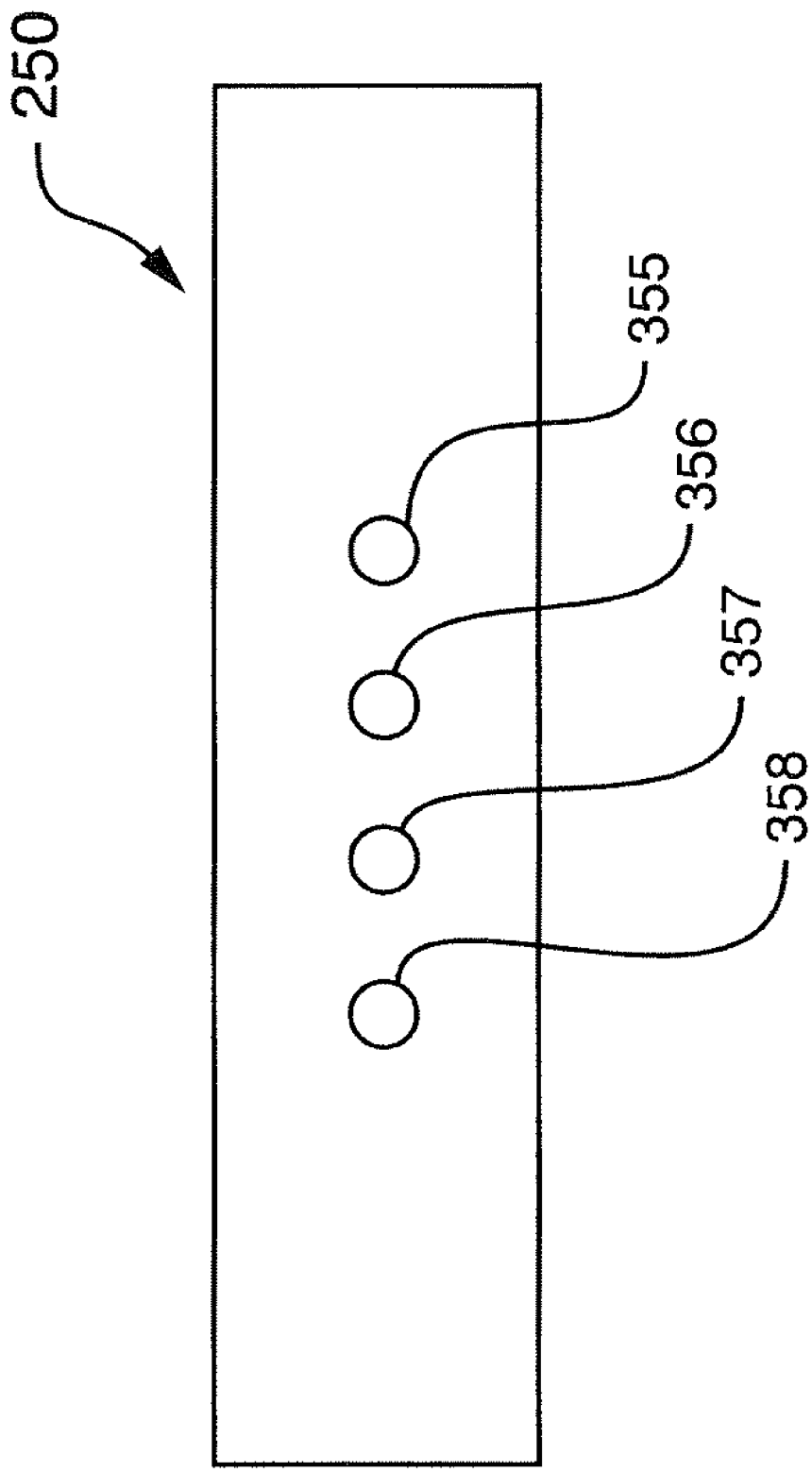
FIG. 3 is a top plan view of the hydrophobic microporous component that is disposed in a cathode chamber of the fuel cell in accordance with the present invention.

The hydrophobic cathode element 250 is shown in further detail in FIG. 3. The element is preferably a thin membrane of expanded PTFE or a layer formed by coating and bonding carbon particles together with polyfluorocarbon compounds. The membrane has micropores, such as the pores 355-358. The micropores are of a pore diameter between about 1.0 and 0.1 μm in order to block liquid water. These pores allow oxygen from the ambient air to pass through to the cathode aspect of the membrane, and they allow limited amount of water in vapor form to escape out of the cell. But, the pores are too small and hydrophobic to allow liquid water to pass through the element 250, so the liquid water that accumulates is pushed back in the other direction across the membrane 104, to the anode as is required for the anode reaction of the fuel cell. This management of water is achieved without any active recirculation conduits, pumps or other mechanical components.

The capillary backpressure exerted on the liquid water entering a highly hydrophobic pore is inversely proportional to the pore diameter, and is described approximately by Eq. (7), $$\Delta P = \frac{2 \cdot \sigma}{r} \quad (7)$$

Where, σ is the surface tension of water in contact with air (71.18 dynes/cm at 30° C.) and r the pore diameter of the micro-pores of cathode backing. A hydraulic permeability measurement for a NAFION® 117 membrane revealed a value of 4.94 μg/(sec cm² atm). The water flux produced at a DMFC cathode operated at 100 mA/cm² is calculated based on a cathodic reaction of Eq. 5, as.

$$R_{water} = \frac{0.1 \text{ A/cm}^2 \cdot 18 \cdot 18 \text{ g/mole}}{2 \cdot 96485 \text{ A} \cdot \text{sec/mole}} 168.0 \text{ μg/(s cm}^2\text{)}$$

From the total water generated, one third (i.e. 56.0 μg/(sec cm²)) is required to be returned to the anode to allow for the anodic reaction to occur. To afford such a water flux return from cell cathode to cell anode, the hydrostatic pressure required is:

$$\Delta P = \frac{56.0 \cdot \text{ug/(sec} \cdot \text{cm}^2)}{4.94 \text{ ug/(sec} \cdot \text{cm}^2 \cdot \text{atm)}} = 11.3 \cdot \text{atm}$$

The maximum pore diameter of hydrophobic micropores required to achieve such backpressure is:

$$r \leq \frac{2 \cdot \sigma}{\Delta P} = \frac{2 \cdot 71.2 \text{ dynes/cm} \cdot 10^{-6} \text{ atm/(dynes/cm}^2)}{11.3 \cdot \text{atm}} = 0.12 \text{ μm}$$

However, if a 2 mil thick membrane is used instead of a 7 mil membrane, the hydraulic permeability will be 3.5 times greater, i.e. 17.3 μg/(sec cm² atm). To drive the same back flux of water ($R_{water}$) the ΔP required is now only 3.2 atm, and the maximum pore diameter of the hydrophobic micropore array would be r≦0.42 μm. With an even thinner polymer electrolyte membrane, such passive water return flux becomes even easier to achieve, in terms of the pressures required and the corresponding sub-micron dimensions of the hydrophobic pores. Another important element in the optimized design of the microporous layer is ascertaining the highest possible hydrophobic characteristics for the sub-micron pores. This is done in this invention by implementing a microporous layer with PTFE contents which are substantially higher than normally encountered in backing layers for fuel cells. For example, microporous layers with weight percentages of 50%-60% PTFE were much more effective in pushing water from the cathode to the anode than the 30% PTFE that is typically contained in microporous layers.

Returning to the water vapor that escapes out through the micropores and travels towards the cathode exterior, some water vapor escape is indeed required to achieve optimized water balance in the cell. However excess water vapor escape causes the cell to dry out. This would be the case when water production rate in a fuel cell operated on neat methanol feed to the cell anode, is less than the water vapor escape rate through the cell cathode given particular cathode construction and operating conditions. In accordance with the invention, the water vapor escape rate can be lessened by using a sufficiently thick cathode backing 120 (FIG. 1). More specifically, the water vapor pressure in plane A shown in FIG. 1, defines the high side of a vapor pressure gradient, which falls across the thickness dimension of the cathode backing layer 120, with the low side determined by the temperature and relative humidity of the ambient, surrounding environment. The water vapor flux is consequently given by equation (4). The water vapor flux is given by:

$$\text{Flux}(ev.) = (D/RT)[P^*_{w,\,Tcath} - P^*_{w,\,Env}](1/\delta) \quad (8)$$

where D is the effective diffusion coefficient of water vapor through the cathode backing, $P^*_{w,\,Tcath}$ is the saturated water vapor pressure at the temperature of the cathode, $P^*_{w,\,Env}$ is the water vapor pressure in the ambient environment, and δ is the thickness of the backing.

The reason the gradient of water vapor falls practically across the thickness of the backing, is that the fine porosity of the backing layer does not allow significant convection within this layer, confining transport to be diffusional. Immediately outside the backing layer, natural convection of air caused by the temperature gradient near the surface of the operating cell, results in setting the vapor pressure at the external surface of the backing equal to that of the ambient environment.

Equation (8) shows that, under given cell operation conditions, i.e., at some given cathode steady state temperature higher than that of the ambient, the flux of water vapor will be inversely proportional to the thickness, δ, of the backing layer. This understanding has led to the conclusion that increasing δ, i.e., employing thicker cathode backing layers would lower the evaporative loss of water from the cathode aspect of the membrane electrolyte. Thus, in accordance with the present invention, a number of different varieties of cathode filters are also described. In accordance with this invention, by limiting the water vapor escape rate from the cell cathode, and preventing liquid water loss with a hydrophilic cathode backing or microporous layer component of the cathode backing, sufficient water can be returned passively through the membrane from the cell cathode to supply sufficient water at the cell anode. Excess water within the cell anode can be conveniently removed with the anodic $CO_2$ exhaust stream, which is directed out of the fuel cell system via the $CO_2$ exhaust port or ports. The result is a passively operated fuel cell that can be operated with a neat methanol feed to the cell anode in a wide range of environmental conditions while effectively supplying water from cathode to anode without the cell drying out or the cathode of the fuel cell being flooded.

Figure 4:
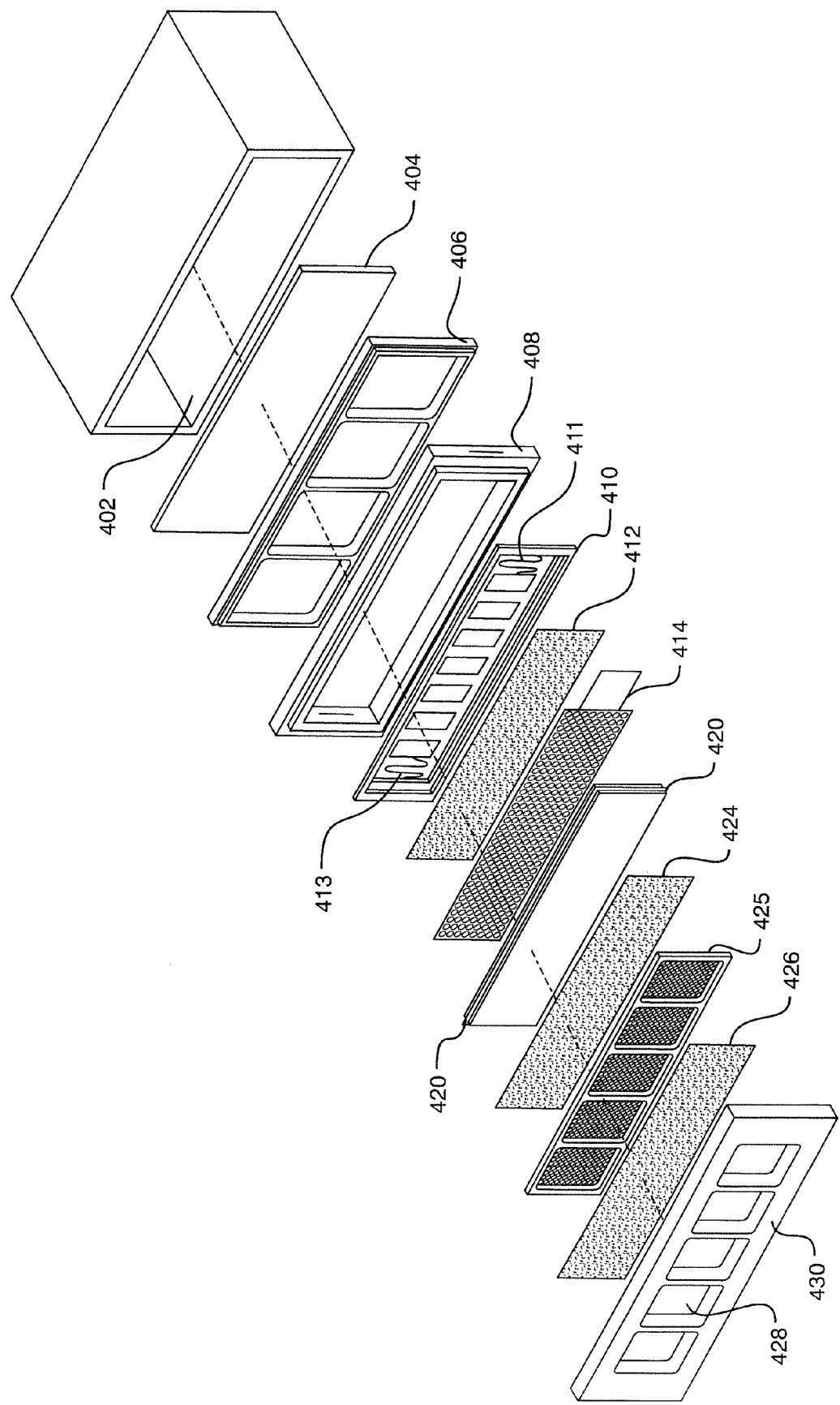
FIG. 4 is a direct oxidation fuel cell system including the water management components of the present invention.

The overall fuel cell system of the present invention will be described with reference to the exploded system assembly illustration of FIG. 4. The system includes a neat methanol (or other fuel substance) to be provided in fuel tank assembly 402. The fuel enters an anode chamber area via a methanol delivery film (or mass transport delivery element) 404, that is held in a suitable frame 406. A $CO_2$ router 410 (that includes flow paths 411, 413) may also be included. The fuel then passes through a hydrophilic anode element 412 and an anode current collector 414 and then makes contact with the catalyzed membrane near the anode aspect of the anode diffusion layer. The diffusion layer and the catalyzed membrane are the components of the membrane electrode assembly, which is collectively designated by reference character 420. The diffusion layer holds the fuel in direct contact with the anode aspect of the catalyzed membrane electrolyte 420 and collects the electronic current off of the anode catalyst. The anode reaction, which is a 6-electron process, proceeds to produce carbon dioxide, 6 protons and 6 electrons. The carbon dioxide travels through the anode diffusion layer 412 and next through the $CO_2$ router device 410. The $CO_2$ is directed through openings in the router, the serpentine paths 411 and 413 and out of the fuel cell stack. The 6 protons cross the protonically-conductive membrane of the MEA assembly 420 and this is aided by water in a well-hydrated NAFION® membrane. The 6 electrons generated in the anodic reaction are collected by the anode current collector 414 which is connected across a load (not shown) to the cathode current collector 422.

On the cathode side, the hydrophobic cathode element 424 (held in place by a cathode compression frame 425), forces liquid water to flow back across the membrane towards the anode, as discussed. And, the added cathode filter 426, which may include a layer of expanded PTFE 428, helps curb water vapor escape while ensuring sufficient oxygen supply, in the manner described herein. The cell assembly top plate 430 holds all of the components in the appropriate position in the system frame 408 that is suitably fastened to the fuel tank assembly 402. Thus, water mass is balanced within the cell to allow neat, or highly concentrated methanol feed without active external recirculation. Accordingly, a highly efficient microfuel cell that has a reduced size and volume has been enabled by the present invention.

EXAMPLES

In order to further illustrate the various aspects of the present invention, a number of examples will be described which relate to the following concepts: 1) passive internal water transport ("water push back") from cathode to anode using a microporous hydrophobic layer, and use of neat methanol; and 2) curbing evaporative water loss by limiting water evaporation rate in the cathode.

Examples of Effective Passive Internal Water Transport from Cathode to Anode Using a Microporous, Highly Hydrophobic Layer, Bonded to the Cathode Aspect of the Membrane in Accordance with the Invention By way of background, and in order to enhance further the understanding of the examples concerning water push back, we first illustrate water loss rate measurements in air-breathing DMFCs in order to reveal the importance of (i) use of a highly hydrophobic microporous layer in accordance with the invention, and (ii) the advantages of robust bonding/lamination of this layer to the cathode aspect of the catalyzed membrane in accordance with the invention.

In a first experiment, there was no pre-bonding of the backing layers to catalyzed membrane of the cell, and the cell was operated under the following experimental conditions: a 1.5 M MeOH solution was supplied to the anode compartment of an air breathing DMFC that included a catalyzed Nafion 117 membrane. One layer of E-Tek anode backing with microporous layer of 30% PTFE was applied on the anode aspect and one layer of E-Tek cathode backing with a microporous layer of 50% PTFE (enhanced PTFE level) was applied on the cathode side. As noted, the backing layers were not pre-bonded to the catalyzed membrane, but were only mechanically compressed to the catalyst coated membrane during cell assembly. At ambient conditions of: 20.9° C., and a humidity of 51%, with a cell internal temperature of 32° C., the cell was discharged at a constant current density of 100 mA/cm$^2$ and water mass balance was recorded. The results showed that 10.2 mole of water was lost from the cell per mole of methanol consumed.

By way of comparison, another experiment was conducted in which a reference cell (Cell No 47) having a 5 cm$^2$ active area was operated under the following experimental conditions: a 1.5 Molar (M) methanol (MeOH) solution was provided in the anode compartment of an air breathing DMFC that included a catalyzed Nafion 117 membrane. One layer of E-Tek anode backing with microporous layer of 30% PTFE applied was on the anode aspect of the membrane and one layer of E-Tek cathode backing having a microporous layer of 50% PTFE (enhanced PTFE level) was applied on the cathode side. However, in this case, the backing layers were pre-bonded to the catalyzed membrane by steam press at 120° C. for 30 min. At ambient conditions of: 20.9° C., a humidity of 51% and a cell internal temperature of 32° C., the cell was discharged at constant current density of 100 mA/cm$^2$ and the water mass balance was recorded. The results indicated that 3.6 moles of water were lost from this cell per mole of methanol consumed, which is one third of the water loss without the pre-bonding of the backing to the catalyzed membrane electrolyte.

It may be desirable in certain applications to balance the amount water in the cell to a greater extent, depending upon operating conditions, and this can be managed using a higher PTFE content in the microporous layer. Accordingly, in yet a further experiment, two cells (Cell No 273 and Cell No 274) were operated to show the effect of PTFE content. More specifically, a 1.5 M MeOH solution was supplied to the anode compartment of an air breathing DMFC that includes a catalyzed Nafion 117 membrane. One layer of E-Tek anode backing with a microporous layer of 30% PTFE was applied on the anode side and one layer of E-Tek cathode backing with a microporous layer of 30% PTFE (ordinary PTFE level) was applied on the cathode side. Note that this amount of PTFE is less than that just discussed. The backing layers were pre-bonded to the catalyzed membrane by steam press. The two 10 cm$^2$ cells were run in series at constant current of 0.65 A at ambient conditions of: 22.0° C. at a humidity of 25% and a cell internal temperature of 37° C. The results indicated that 5.3 mole of water were lost per mole of methanol consumed. This is significant because it indicates that the cell with a cathode backing that is comprised of 30% PTFE described herein loses 50% more water than the otherwise identical cell with a cathode microporous layer comprising 30% PTFE.

The results of the above tests clearly demonstrate that sufficient water confinement in the cell is strongly facilitated by the teachings of this invention regarding the critical role of a cathode microporous layer of higher-than-usual PTFE content and the robust lamination of this layer onto the catalyzed membrane.

The next several examples illustrate the ability to internally retrieve all water required for the complete anodic oxidation process when 100% methanol is fed to the anode of the fuel cell through a perevaportation membrane, provided that an optimized, well bonded cathode backing with an optimized microporous layer is introduced. These examples further illustrate the advantages achieved when using a thinner membrane (PCM). The results given here were obtained using single cell test fixtures. The cells had an active electrode area of 5 cm$^2$. In most cases, NAFION® membranes with an equivalent weight of 1100 grams and of 2 mil and 3.5 mil in thickness were used. An anode catalyst layer was made from a suitable mixture of high surface area platinum/ruthenium (PtRu) alloy particles at 1:1 Pt:Ru atomic ratio (which is available commercially as PtRu, Hi SPEC t6000, Alfa Aesar, a. Johnson Matthey Company), and recast NAFION® ionomer (available commercially as 1100 equivalent weight Nafion solution, Solution Technology, Inc, Menden Hall, Pa.) was used. The cathode catalyst layer was made from a suitable mixture of high surface area Pt particles (available commercially as Pt black, Hi SPEC t1000, Alfa Aesar, a Johnson Matthey Company), and recast NAFION® ionomer. The anode and cathode catalyst layers were placed directly on the membrane electrolyte (or alternatively, on the backing layers). The membrane electrode assembly was formed by laminating the anode backing and the cathode backing to the catalyst coated polymer electrolyte membranes. To laminate the cathode microporous layer to the cathode catalyst layer to form 5 cm$^2$ MEAs, a force of 3200 pounds was applied at a temperature of 105° C. for a period of 4 min. The quality of the lamination provides further advantages to achieving the desired liquid water blocking and push-back.

During the test the cell anode was fed from a body of neat methanol liquid stored in the anode compartment at the start of the test, and oxygen from air was supplied to the cell cathode by its natural diffusion without actively moving air using a fan or air-pump (i.e. "air breathing"). At the start of a test, a 7 gram amount of neat methanol was placed inside a polypropylene sample cup (available commercially from Premier Lab Supply, as part number SC-4131). A 5 mil (polydimethylsiloxane) silicone membrane was used to form a seal over the liquid of neat methanol at the opening of the sample cup. The methanol filled sample cup had an opening area of 4.8 cm$^2$, where one side of the silicone membrane was in contact with the neat methanol stored inside the cup. Here, the silicone membrane and the methanol vapor-filled gap between the silicone membrane and cell anode backing defined the methanol fuel supply rate to the cell anode at a suitable level. Alternatives to the silicone membrane, including but not limited to, other methanol permeable membranes such as Polyether Polyurethane can also be implemented. The methanol supply rate through various methanol permeable materials to the cell anode was measured and found equivalent of 100-200 mA/cm$^2$. From the mass changes and methanol concentration measurement, a complete mass balance analysis was performed for each fuel cell test run. Together with the fuel cell electrical energy output, the fuel cell energy conversion efficiency was derived.

Examples of Operation with Neat (100%) Methanol Supply, While Effectively Providing Sufficient Water Back to the Anode by Means of the Cathode Structure of the Present Invention An experiment was conducted in which the cathode backing was comprised of two layers of two-side-coated carbon cloth backing (ELAT/DS/NC/V2 Double Sided, De Nora North America, Inc, N.J.). The cathode microporous layer coating on the carbon cloth fabric contained 50% wt PFFE and 50% carbon. The anode backing used for this cell was one layer of single side-coated carbon cloth backing (ELAT/SS/NC/V3 Single Sided, De Nora North America, Inc, N.J.). The microporous layer coating on the carbon cloth fabric on the anode side contained 30% wt PFFE and 70% carbon. The MEA was made by laminating the anode and cathode backings on to a catalyst coated Nafion 112 membrane. The methanol permeable membrane over the body of neat (100%) methanol liquid was a 5 mil thick silicone. An additional cathode filter consisted of 6 layers of Gore expanded PTFE membrane with an average pore diameter of 0.02 um (0.02 um ePTFE w/NW PET backer, W.L. Gore & Associates, Inc., Charlotte, N.C.), placed against the outer surface of the cathode backing. The $CO_2$ produced at the cell anode was ventilated from the anode chamber through a hole of 0.1 mm in diameter in the lid cover.

Figure 5:
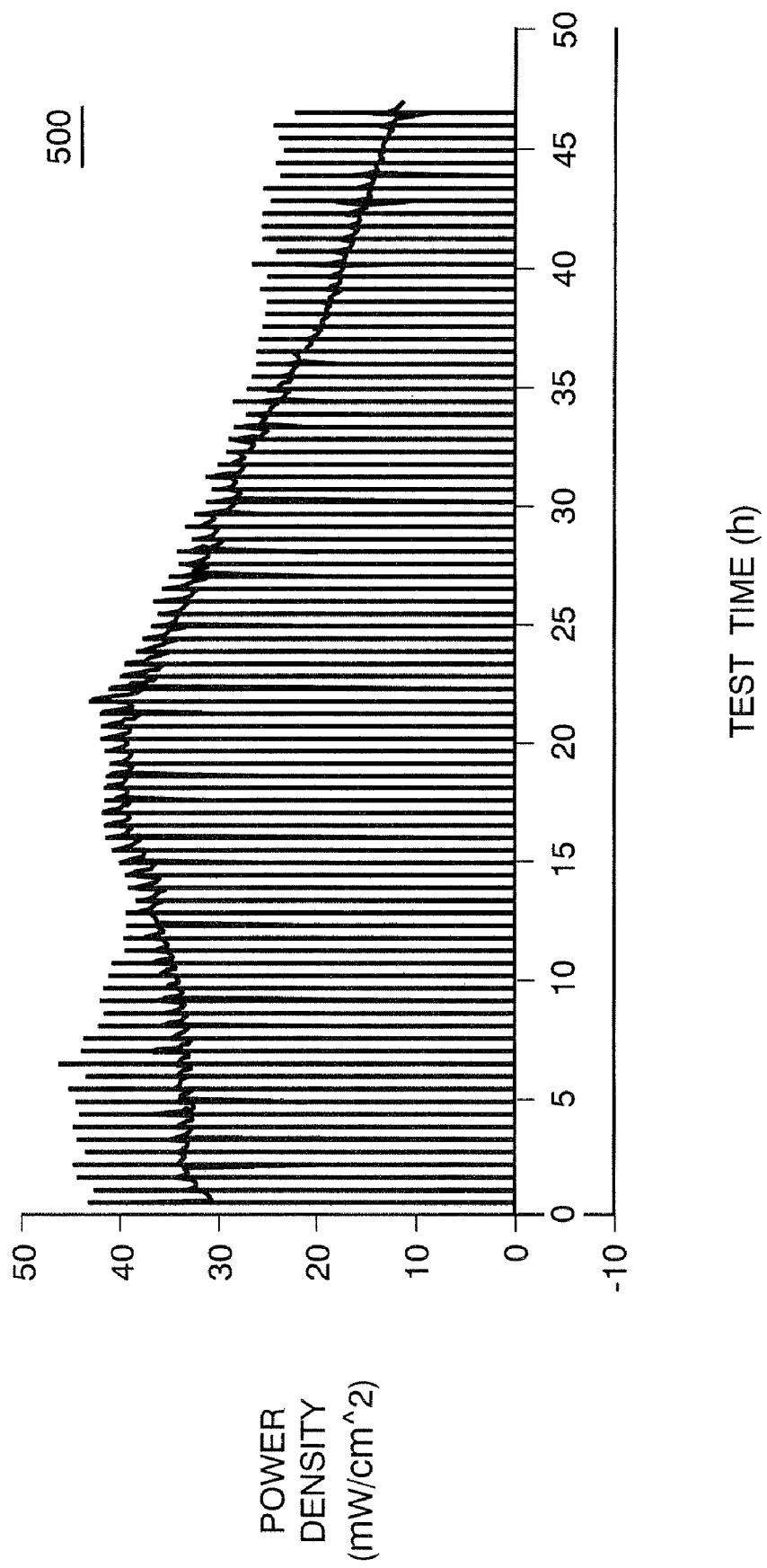
FIG. 5 shows the power density of cell in accordance with the invention discharged at 0.3 V during a 47 h test.
Figure 6:
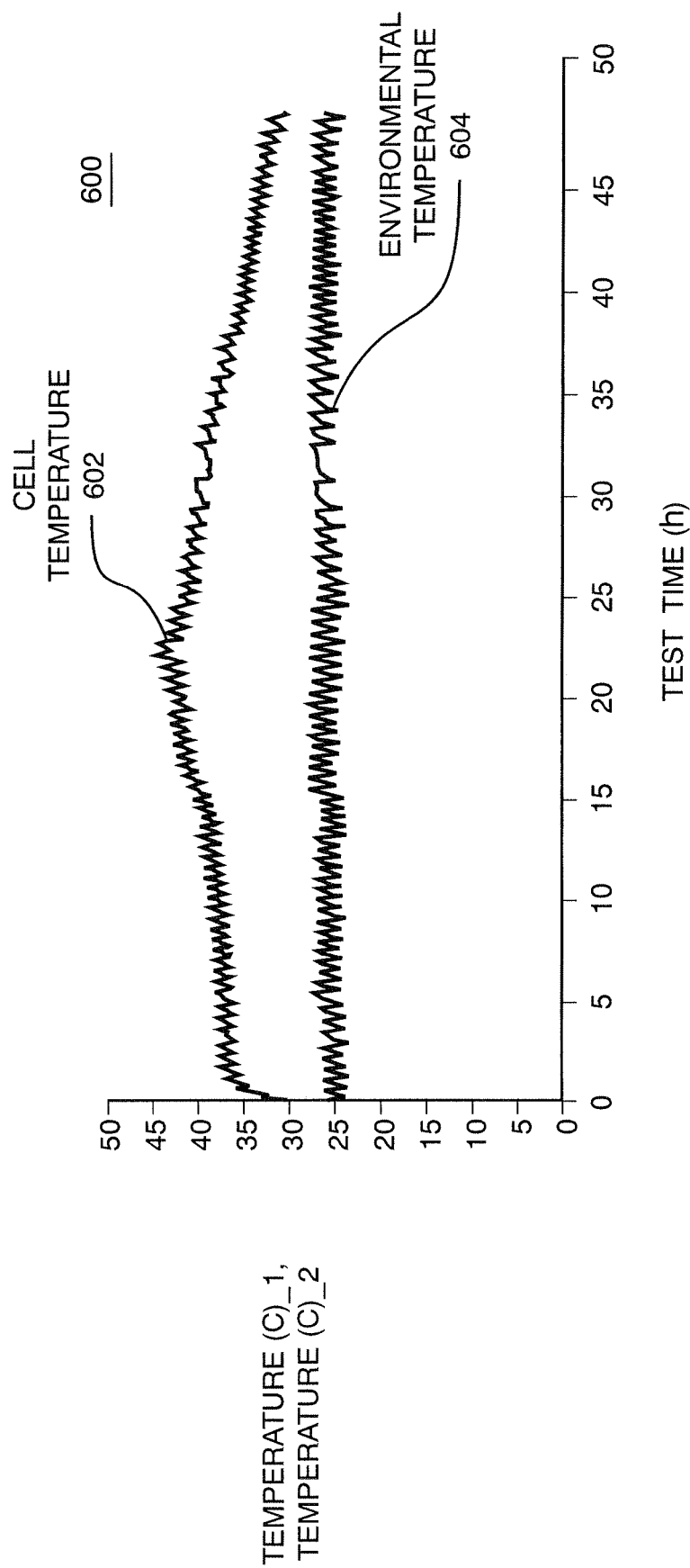
FIG. 6 is a graph of test time against cell temperature, and environmental temperature, during the test of FIG. 7.
Figure 7:
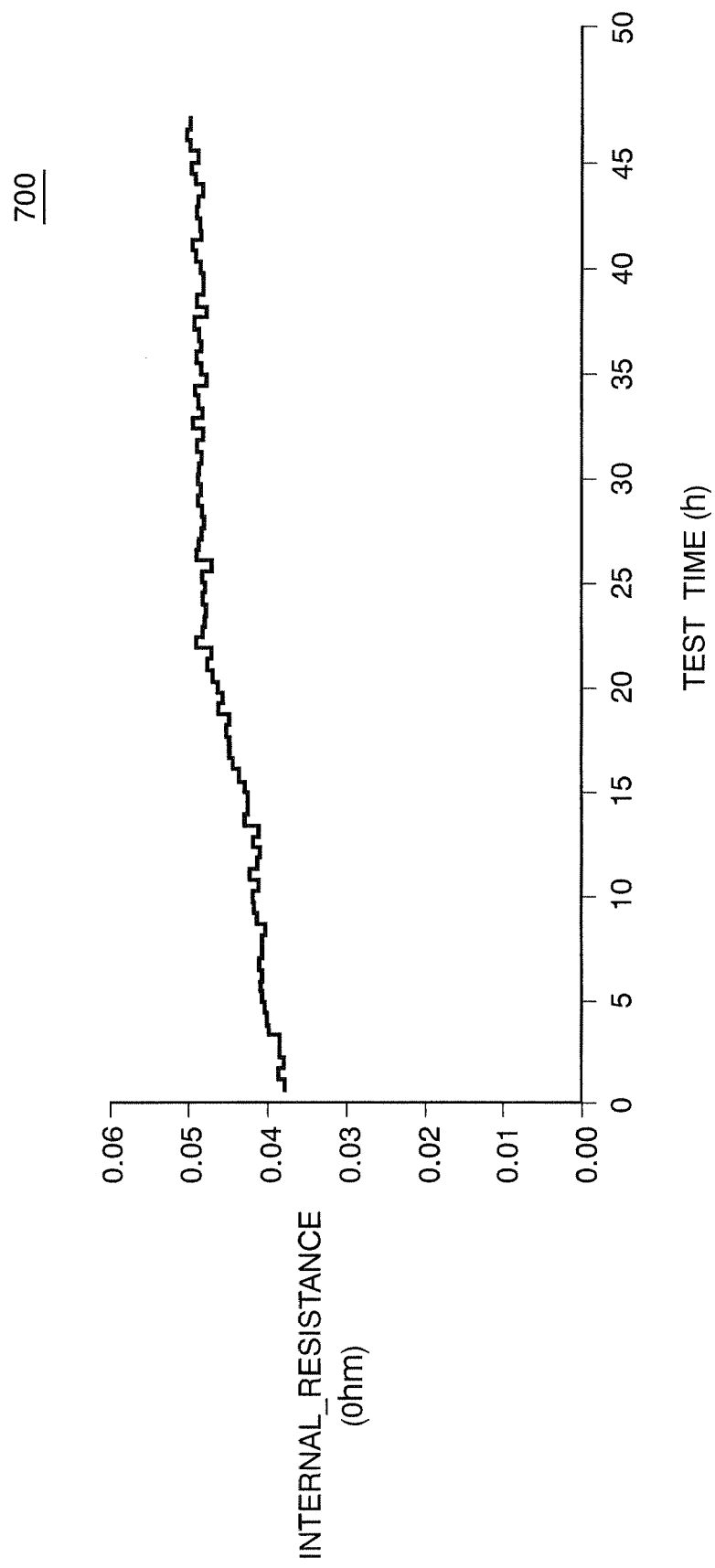
FIG. 7 is a graph of cell resistance during the test of FIGS. 5 and 6.

FIG. 5 shows a graph 500 of power density in mW/cm$^2$ vs. time, during a 47 h test of this cell. The environmental temperature during the test was 25° C., and the relative humidity was 15%. Both cell temperature and the environmental temperature were recorded and are shown in FIG. 6 which is a graph 600 of the test time in hours on the x-axis, against cell temperature (Celsius) plot 602, and environmental temperature (Celsius), plot 604 during the test of this DMFC discharged at 0.3V with neat methanol feed to the anode The fuel cell electric energy output in terms of Watt-hours (Wh) per c.c. of methanol consumed was 0.85 Wh/cc, demonstrating a fuel cell overall energy conversion efficiency of 17.9% at an average power density of 29.5 mW/cm$^2$, and peak power density of 40.5 mW/cm$^2$. At the end of the run, 91.7% of neat methanol placed in the anode compartment at the start of the run was consumed. FIG. 7 is a graph 700 of the cell resistance in Ohms during the test of FIGS. 5 and 6. Only a slight increase in cell resistance was observed towards the end of the test, accompanied by a decrease in cell operating current, showing good confinement of the water generated in the cell. This effective confinement is provided by the well-bonded, highly hydrophobic cathode microporous layer of the present invention.

Figure 8:
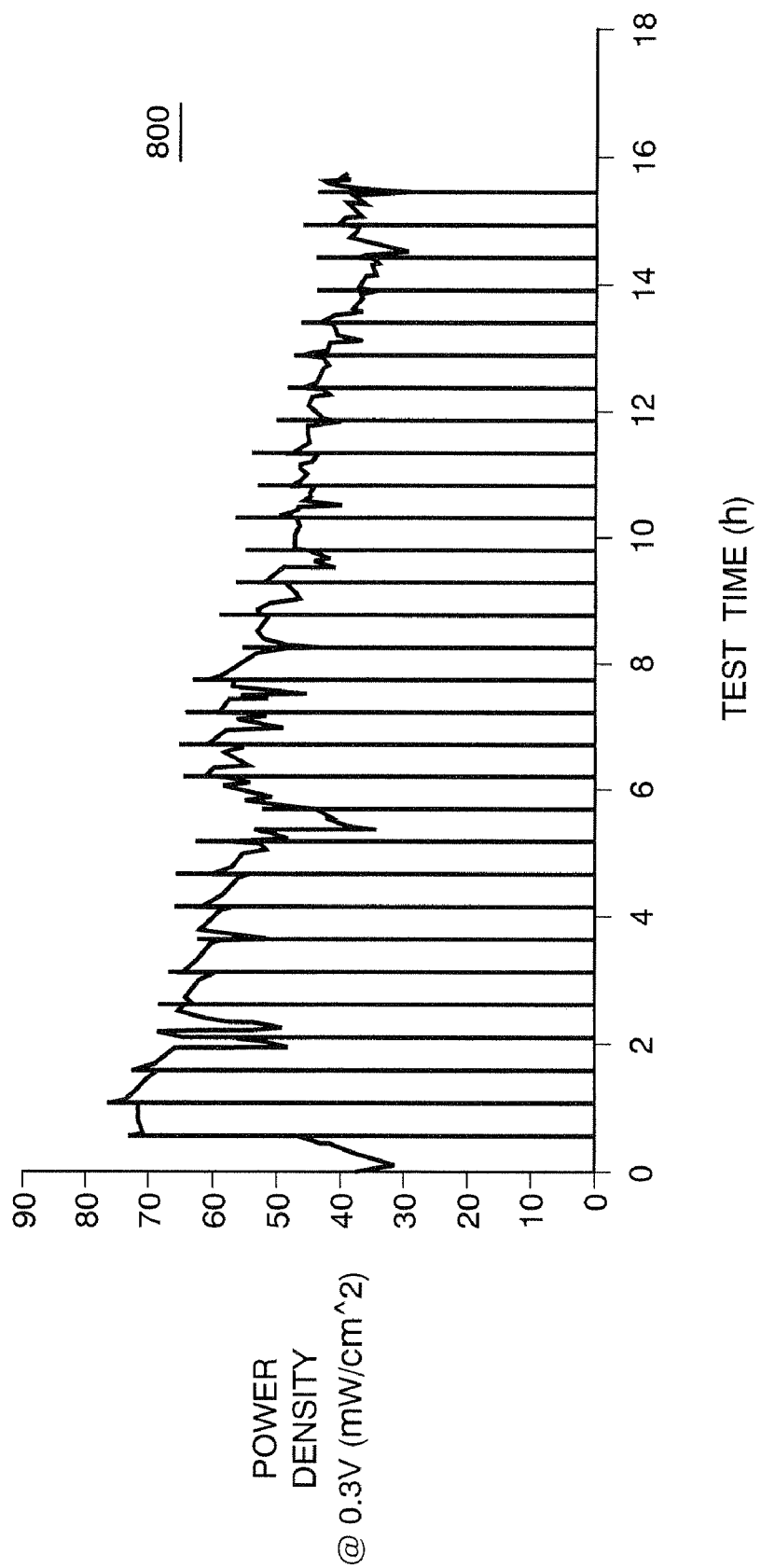
FIG. 8 is a graph of test time against power density in $mW/cm^2$ of another embodiment of the fuel cell of the present invention.
Figure 9:
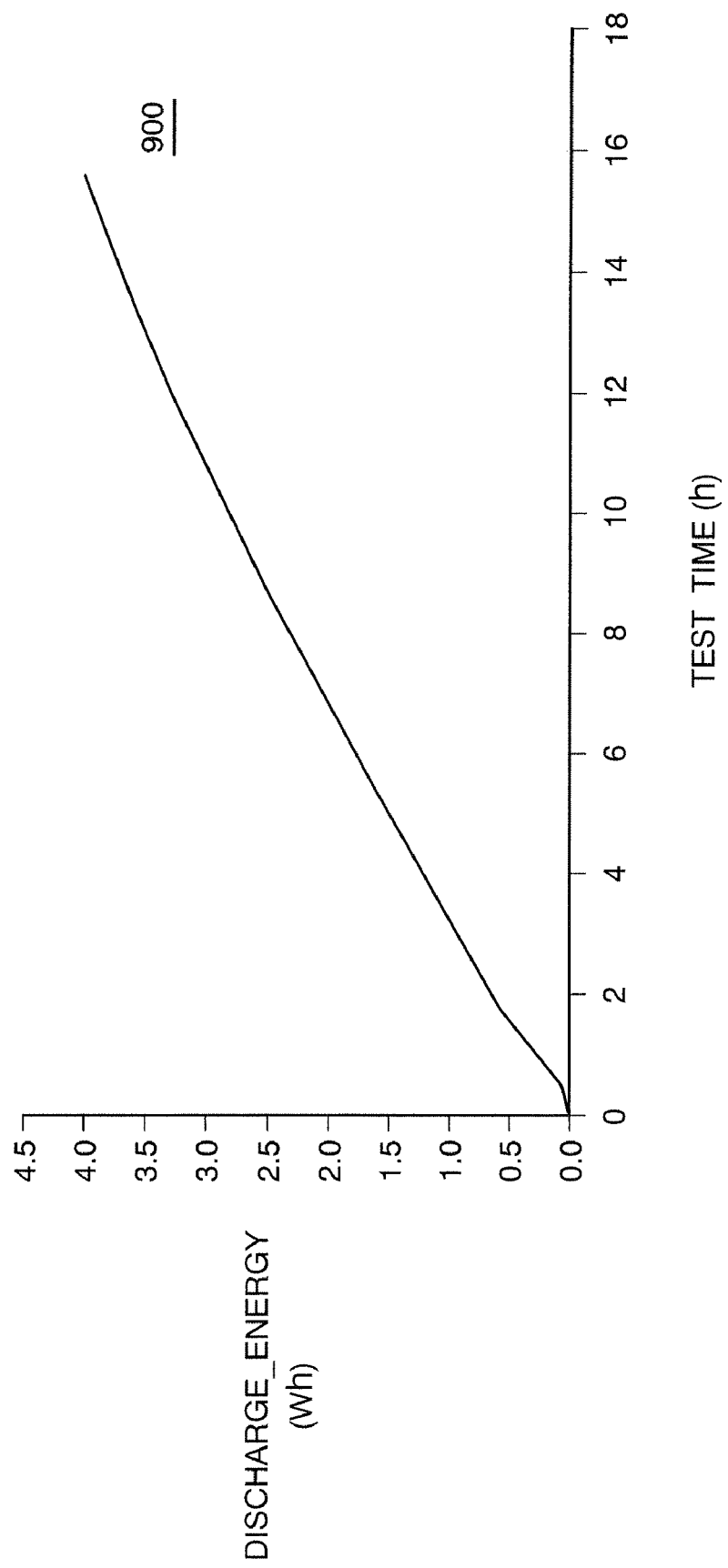
FIG. 9 is a graph of test time against discharge energy for the cell of FIG. 11.
Figure 10:
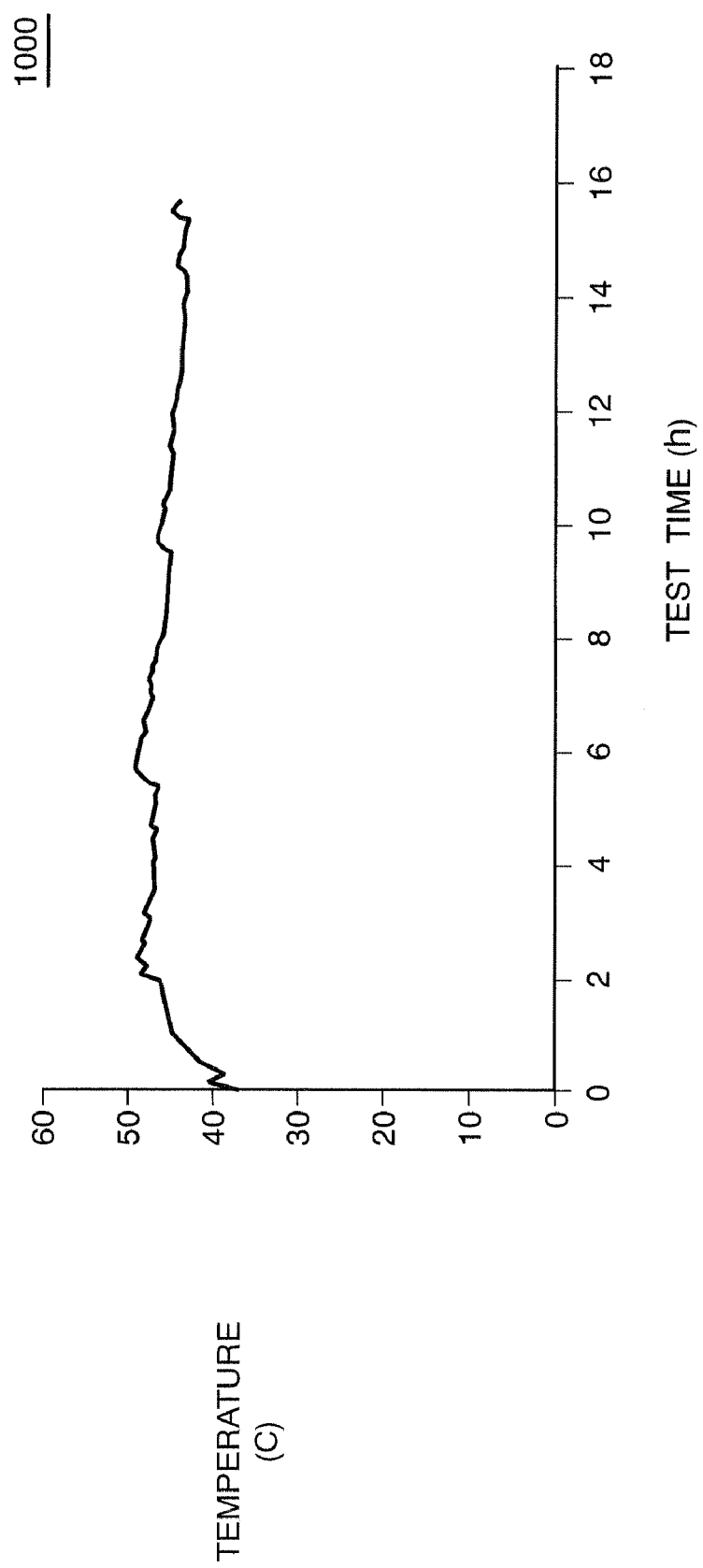
FIG. 10 is a graph of test time against the cell temperature for the cell of FIG. 11.
Figure 11:
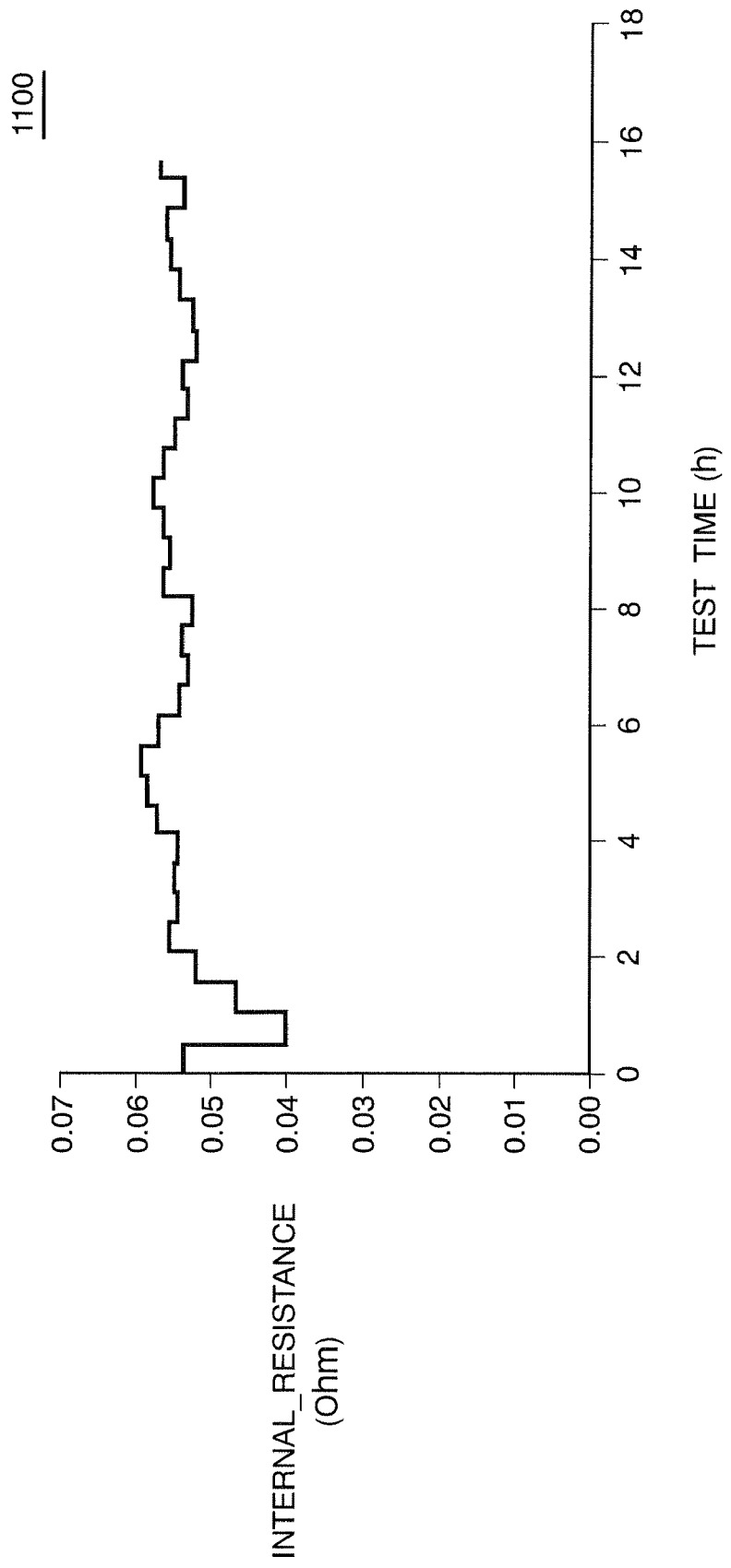
FIG. 11 is a graph of test time against the internal cell resistance for the experiment of FIG. 8.

The same cell configuration was used as in the previous example, relying on the cathode microporous layer being well bonded to the catalyzed membrane, to ensure confinement and redirection of cell generated water in the DMFC fed with 100% methanol. In this experiment, the cell was operated in an environmental chamber set at 32° C. and 20% humidity. FIG. 8 is a graph 800 of power density in mW/cm$^2$ of the cell vs. time, during discharge at 0.3 V lasting 16 hrs. FIG. 9 is a graph 900 of discharge energy in Wh vs. Time for the cell of FIG. 8. FIG. 10 is a plot 1000 plotting of cell temperature (C) for the same test. FIG. 11 is a graph 1100 of the internal the cell resistance (ohms) against test time (h). The maximum cell power density reached was 70 mW/cm$^2$ at a cell temperature of 44° C. From mass balance performed, the electrical energy output per c.c. of methanol consumed was 1.07 Wh/cc, demonstrating energy conversion efficiency of 22.5% at a discharge voltage of 0.3V. The average power density was 50.5 mW/cm$^2$.

The energy derived per cc of fuel, 1.07 Wh, in a DMFC operating at 0.3V, provides direct evidence for a complete methanol oxidation process at the anode, proving in turn that the anode receives all the water required for process (1) where such water can only originate from the cell cathode process and effectively flow back to the anode thanks to the cathode microporous layer which is the subject of this invention. The relatively stable cell resistance during the entire test indicates that the membrane remains fully hydrated and the cell operates with neat methanol feed to the anode, without either dehydration or flooding, once a highly hydrophobic, cathode microporous layer well bonded to the catalyzed membrane is implemented.

Figure 12A:
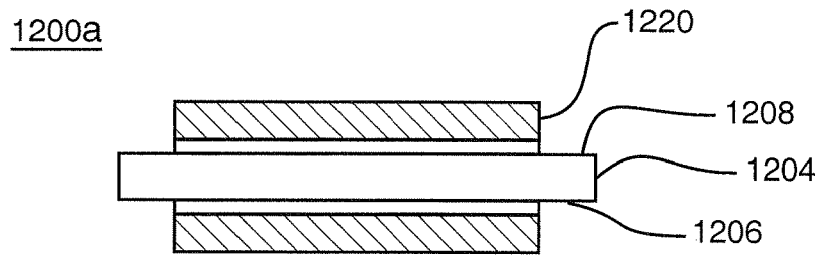
FIGS. 12A-12C are alternative embodiments of a cathode backing layer and cathode filter assembly in accordance with the present invention.
Figure 12B:
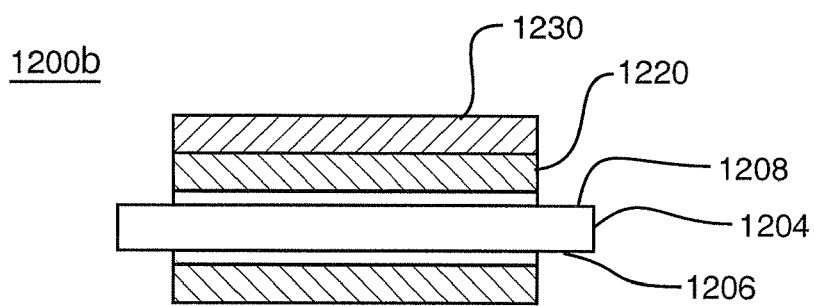
Figure 12C:
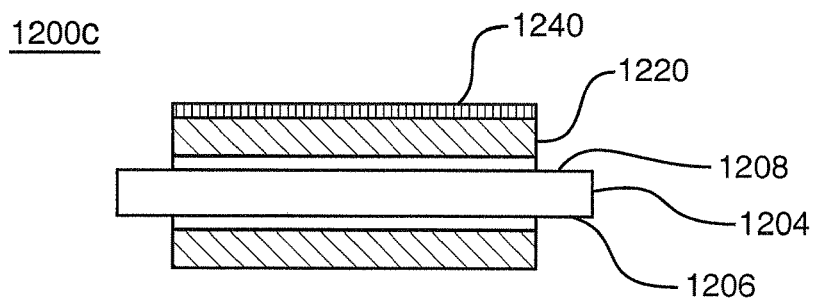

Examples of Curbing Evaporative Water Loss from the Cathode by Using Cathode Backing Layers in Accordance with the Present Invention FIGS. 12A-12C compare the scheme of the ordinary membrane/electrode assembly 1200A (MEA) of the DMFC (FIG. 12A) with that of an MEA 1200B of the pre-sent invention that has a cathode backing that has been doubled in thickness, stacking two layers 1220, 1230 of the same backing (carbon cloth) material (FIG. 12B). In all the following examples, the cathode backing used was E-Tek DS V2, with an uncompressed single layer thickness of 14 mil. The effect of doubling of the thickness of the cathode backing as means to limit rate of cathode water vapor escape has been tested. When measuring net water loss from an operating, air breathing DMFC with anode feed of 2.00 M methanol controlled by dosing of 16.8 M methanol into a methanol/water reservoir, the water loss rate measured from a cell with single cathode backing, as ordinarily used, was 3.0±0.1 molecules of water per molecule of methanol consumed in the cell process.

The DMFC for which this rate of water loss was measured, was operated at cell voltage of 0.35 V in air-breathing mode, within an environmental chamber set at 23° C. and 40% relative humidity, resulting in inner air temperature of 40° C. and generating 32 mW/cm$^2$ power output at 61% fuel utilization efficiency. Such rate of water loss (3 molecules per molecule of methanol consumed), means that all water generated in the cell process at the cathode of the fuel cell is lost by evaporation plus one additional molecule of water lost per each molecule of methanol consumed. Unless this excessive loss of water through the cathode is corrected by limiting somehow the rate of evaporative water loss, a water mass balance in the anode can be maintained only by capturing externally the water vapor escaping from the cell cathode and returning it to cell anode by means of a pump. Alternatively, water at a molecular ratio of 1 water:1 methanol must be contained in the reservoir and delivered to the anode of the fuel cell as part of the fuel feed, with the highest feed methanol concentration then limited to approx 65 wt % methanol by weight, resulting in loss of 35% of the energy capacity of the reservoir vs. the case of 100% methanol. After doubling of the cathode backing thickness, as in FIG. 12B, the drop in rate of evaporative water loss has been cut significantly, resulting in a measured net rate of water loss under similar operation conditions falling to 1.96 water molecules per methanol molecule consumed. Under identical operating conditions, the cell with the dual backing layer generated 37.7 mW/cm$^2$ power output at 0.35 V at 67% fuel utilization efficiency, i.e., the performance not only did not fall but, rather, increased following introduction of the doubled backing according to this invention. With this lower evaporative water loss rate from the cell, water generated in the overall cell process (3) is sufficient to fully provide for the lower evaporative loss, maintaining sufficient inner cell water content even with neat methanol (100% by weight) feed to the cell, without resorting to pumping or any other external water management apparatus. This element of the present invention thus allows maintaining water balance within the cell without any water added in the feed stream or any means for external or active water management.

It is noted that, as the cathode backing is made thicker (FIG. 12B), the rate of oxygen diffusion to the cathode is diminished together with the rate of evaporative water loss, as the thickness of the backing controls access for the former and loss for the latter. However, the effect on cell performance, in terms of cell current obtained at given cell voltage, is found negligible when operating a cell of this embodiment of the invention, as long as the number of cathode backing stacked is not excessive. Even with 3 such E-Tek diffusion layers stacked, the DMFC in air-breathing mode still produced 40 mW/cm$^2$ power output at 0.35 V with a 67% fuel utilization efficiency. The reason for this behavior, is that an oxygen electrode with a single backing layer is not limiting the cell current in a DMFC operating near ambient conditions. Oxygen transport through the cathode backing can be therefore somewhat further limited to achieve the required curbing of water vapor loss, at substantially no cell performance penalty.

In accordance with an alternative aspect of the invention, instead of using multiple backing layers to achieve the desired thickness required to limit water vapor escape rate, it may be more convenient to use a single backing layer comprised of carbon paper or carbon cloth with suitable thickness and porosity/tortuosity, to achieve the same effective barrier to water vapor escape.

Examples of Use of Cathode Filter to Limit Water Vapor Escape

Another approach to limiting of water vapor rate of escape from the cathode, is depicted in FIG. 12C. Here, a top layer 1240 on the cathode exterior ("cathode filter") is different in nature from the backing layer 1220, providing, however, similar required curbing of water vapor escape from the cathode. Layer 1240 does not need to be electronically conducting and would be typically made of expanded PTFE to avoid liquid water build-up and maintain openness for air access.

Measurements of the lowering of water loss in fuel cells operating with the cathode backing and filters of the present invention, are described by the following examples. Two cells (Nos. 558 and 568) were run in an environmental chamber set at 20° C. and 50% relative humidity, with and without cathode filters respectively. Table 1 lists various expanded PTFE films tested as the filters, and their properties. Table 2 lists the mass balance results cell performance and water loss per methanol consumed. An average reduction in water loss of one water molecule per methanol molecule consumed was measured after attaching the filter on the cell cathode backing. As Table 2 shows, the reduction in the rate of water loss was achieved with a small penalty in cell performance at 0.35 V.

TABLE 1

Some porous films of expanded PTFE tested to minimize water loss rate from cells:

| Manufacturer/vendor | | Thickness, mil | % openness | Sample No |
|---|---|---|---|---|
| Norton Performance Films | A-105 | 7.5 | 75 | 101501-3R |
| Norton Performance Films | A-110 | 2.5 | 65 | 060397-5 |
| Norton Performance Films | A-135 | 5 | 65 | 042001-1 |
| Norton Performance Films | A-145 | 4.5 | 65 | 012901-1 |
| Norton Performance Films | G-106 | 6 | 50 | 121301-D |
| Norton Performance Films | G-108 | 8 | 45 | 102301-G |
| Norton Performance Films | G-110 | 10 | 40 | 121301-A |
| Gore | Gore 0.02u | 7.2 | | 268614056 |
| Gore | Gore 0.45u | 5.2 | | 263552275-0 |
| Gore | Gore 0.2u | 5.5 | | 263562275 |

TABLE 2

Comparison of cell performance and water loss for cells with and without cathode filter: All cells used single E-Tek cathode backing with two hydrophobic microporous layer on each side of 50% PTFE content.

| | Membrane | cell voltage (V) | Avg. current (A) | Avg. cell Temp (C.) | Average MeOH Concentration (M) | Fuel Efficiency Eff % | Total Conversion Efficiency % | H2O loss/MeOH Consumed mole/mole |
|---|---|---|---|---|---|---|---|---|
| 558 | None | 0.3494 | 0.4759 | 31.9 | 0.9161 | 56.9 | | 4.0 |
| 568 | None | 0.3492 | 0.5363 | 33.78 | 0.9828 | 63.0 | | 4.1 |
| 558 | A135 | 0.3494 | 0.3605 | 31.6 | 0.8416 | 53.5 | 15.5 | 3.1 |
| 558 | G108x2 | 0.3494 | 0.386 | 31.8 | 0.9205 | 52.0 | 15.0 | 3.0 |
| 558 | Gore 0.2u | 0.3494 | 0.3649 | 31.7 | 0.9300 | 47.7 | 13.8 | 3.1 |
| 558 | G110 | 0.3495 | 0.3382 | 31.4 | 0.9140 | 48.2 | 13.9 | 2.9 |
| 568 | Gore 0.2u | 0.3486 | 0.3961 | 32.4 | 0.8776 | 49.7 | 14.3 | 2.8 |
| 568 | Gore 0.45u | 0.3486 | 0.3999 | 33.1 | 0.8888 | 48.2 | 13.9 | 3.2 |
| 568 | Gore 0.2u | 0.3486 | 0.4194 | 33.5 | 0.9042 | 49.6 | 14.3 | 3.0 |
| 568 | A145 | 0.3487 | 0.346 | 33 | 0.9149 | 46.9 | 13.5 | 3.5 |

Despite of the inherent reduction of oxygen cathode permeability involved, there is no significant loss of cell performance.

As illustrated in FIGS. 12A-12C and the examples, the present invention provides an improved, passive direct oxidation fuel cell by providing a cathode structure that significantly reduces the rate of evaporative water loss. This novel cathode modification has the significance of allowing such reduction in vapor loss with either very little, or no loss in performance when compared with a cell with an ordinary cathode construction.

A Further Example of Curbing Evaporative Water Loss

Four cells were prepared identically, except that the number of cathode backing layers was varied from 1 to 4 layers of double-side-coated carbon cloth backing (available commercially as ELAT/DS/NC/V2 Double Sided, from De Nora North America, Inc, N.J.). The anode backing used was two layers of the double-side-coated carbon cloth backing (available commercially as ELAT/DS/NC/V2 Double Sided, from De Nora North America, Inc, N.J.). The MEAs used were made by laminating the anode and cathode backings on to the catalyst coated N112 membranes. Two layers of Polyether Polyurethane (manufactured by Deerfield Urethane, the membrane material is 3 mils thick, the part number is PT6310) were used over the opening a cup to define methanol transport to the cell anode from neat (100%) methanol liquid stored in the sample cup. The cathode filter used consisted of 6 layers of Gore expanded PTFE membrane with an average pore diameter of 0.02 um (0.02 um ePTFE w/NW PET backer, W.L. Gore & Associates, Inc., Charlotte, N.C.). The $CO_2$ produced at the cell anode was ventilated from the anode chamber through a hole of 0.1 mm in diameter through the lid cover. These four cells were discharged at 0.3 V simultaneously for 64 hs on a bench top at room temperature (24-25° C.). Table 4 summarizes the mass balance results.

TABLE 4

DMFC performance parameters for 64 hrs discharge at 0.3 V, 25° C. ambient temperature with the cell anode fed with neat (100%) methanol and the cathode air-breathing.

| Cell ID | No of Anode backing layers | No of Cathode Backing Layers | Average power Output mW/cm² | energy conversion efficiency Wh/cc | $R_{cell}$ mΩ | Discharged In 64 hs Wh |
|---|---|---|---|---|---|---|
| C2222 | 2 | 1 | 9.70 | 0.67 | 104.4 | 3.261 |
| C2265 | 2 | 2 | 11.90 | 0.77 | 82.9 | 4.011 |
| C2274 | 2 | 3 | 12.20 | 0.81 | 74.9 | 4.168 |
| C2506 | 2 | 4 | 20.0 | 0.81 | 78.0 | 6.432 |

These last results show that, with only single cathode backing layer, the cell resistance when fed with 100% methanol, was higher, as explained by excessive evaporative water loss from the cell cathode. Consequently, the cell power output and fuel cell energy conversion efficiency decreased. With two or more cathode backing layers, the fuel cell demonstrated increased cell power output and lower cell resistance, demonstrating the effectiveness of cathode structure modifications subject of this invention.

It should be understood from the description and the examples that the present invention provides passive water management techniques a direct oxidation fuel cell system that includes an inventive highly hydrophobic component with sub-micrometer wide pores that is laminated to the catalyzed membrane electrolyte on the cathode side. This component blocks liquid water from traveling out of the cathode and instead causes the water to be driven through the polymer membrane electrolyte to the cell anode without adding complexity or bulk to the fuel cell. A cathode backing and additional cathode filter components on an exterior aspect of the cell cathode lessen the water vapor escape rate from the cell cathode. The combination of the well laminated hydrophobic microporous layer, the thicker backing and the added filter layer together define a cathode structure of unique water management capacity, that enables operation of a DMFC with direct, controlled rate supply of neat (100%) methanol, without the need for any external supply or pumping of water.

The foregoing description has been directed to specific embodiments of the invention. It will be apparent, however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A membrane electrode assembly for use in an associated direct oxidation fuel cell, comprising:
   (A) a protonically conductive, electronically non-conductive membrane electrolyte, having an anode aspect and a cathode aspect;
   (B) an anode catalyst disposed in contact with said anode aspect of the protonically conductive, electronically non-conductive membrane electrolyte;
   (C) a cathode catalyst that is suitable for oxygen electro-reduction reactions being disposed in contact with said cathode aspect of the protonically conductive, electronically non-conductive membrane electrolyte;
   (D) a microporous layer located between the cathode catalyst and a cathode backing layer, wherein the microporous layer blocks liquid water that is generated on the cathode aspect from migrating out through the cathode backing layer and forces the liquid water to travel across the protonically-conductive membrane to the anode catalyst for complete anodic oxidation, without any external supply or external redirection of the water, wherein the microporous layer comprises a layer of expanded PTFE facilitating cathode liquid water blocking;
   (E) an anode diffusion layer that is in contact with the anode catalyst on the membrane electrolyte; and
   (F) a fuel supply comprising neat methanol.

2. The membrane electrode assembly of claim 1, wherein when operated with the neat methanol supply to the anode diffusion layer at a rate of approximately 100% of a design cell current, at least 80% of the methanol is converted to $CO_2$ at a cell voltage above 0.3V.

3. The membrane electrode assembly of claim 1, wherein the microporous layer has a PTFE weight percentage of greater than or equal to 50%.

4. The membrane electrode assembly of claim 1, wherein the microporous layer comprises micropores that are of a pore diameter between about 1.0 and 0.1 μm in order to block the liquid water.

5. The membrane electrode assembly of claim 1, wherein the microporous layer comprises a layer formed by coating and bonding carbon particles together with polyfluorocarbon compounds.

* * * * *